United States Patent
Knox et al.

(10) Patent No.: US 11,256,809 B2
(45) Date of Patent: Feb. 22, 2022

(54) SECURITY FOR PRIVATE DATA INPUTS TO ARTIFICIAL INTELLIGENCE MODELS

(71) Applicant: salesforce.com, inc., San Francisco, CA (US)

(72) Inventors: Abigail Reyes Knox, Oakville (CA); Daniel Thomas Harrison, Newmarket (CA)

(73) Assignee: salesforce.com, inc., San Francisco, CA (US)

( * ) Notice: Subject to any disclaimer, the term of this patent is extended or adjusted under 35 U.S.C. 154(b) by 505 days.

(21) Appl. No.: 16/367,515

(22) Filed: Mar. 28, 2019

(65) Prior Publication Data
US 2020/0311273 A1     Oct. 1, 2020

(51) Int. Cl.
*H04L 29/06*     (2006.01)
*G06F 21/57*     (2013.01)
*G06N 5/02*     (2006.01)

(52) U.S. Cl.
CPC .............. *G06F 21/57* (2013.01); *G06N 5/02* (2013.01); *G06F 2221/031* (2013.01)

(58) Field of Classification Search
CPC ...... G06F 21/57; G06F 2221/031; G06N 5/02
See application file for complete search history.

(56) References Cited

U.S. PATENT DOCUMENTS

| | | | |
|---|---|---|---|
| 2017/0097951 A1* | 4/2017 | Nachiappan | G06F 16/25 |
| 2018/0247648 A1* | 8/2018 | Nadimpalli | G06F 15/76 |
| 2018/0300502 A1* | 10/2018 | Mandal | G06Q 30/0282 |

* cited by examiner

*Primary Examiner* — Shawnchoy Rahman
(74) *Attorney, Agent, or Firm* — Holland & Hart LLP

(57) ABSTRACT

Methods, systems, and devices for supporting security for private data inputs to artificial intelligence models are described. A device (e.g., an application server) may receive a request to run an artificial intelligence model. The device may run the artificial intelligence model on a public data set and an extended set of data that includes both the public data set and a private data set. The device may determine a first set of outcomes based on running the artificial intelligence model on the public data set and a second set of outcomes based on rerunning the model on the extended set of data. The device may then compare the two sets of outcomes to determine whether a private data value is identifiable based on the second set of outcomes. If a private data value is identifiable, the device may obfuscate the results prior to transmitting the results to the requestor.

20 Claims, 12 Drawing Sheets

SECURITY FOR PRIVATE DATA INPUTS TO ARTIFICIAL INTELLIGENCE MODELS

FIELD OF TECHNOLOGY

The present disclosure relates generally to database systems and data processing, and more specifically to security for private data inputs to artificial intelligence models.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, CRM solutions, among other solutions (e.g., medical solutions, psychological solutions, etc.), may benefit from data analytics. Applications supporting artificial intelligence enhanced data analytics may greatly increase the scope of data processing and model generation by automating much of the data analysis process. However, conventional systems may implement data analytics applications that do not consider privacy implications of the source data. Applications supporting artificial intelligence enhanced data analytics may run artificial intelligence models on a source data set upon receiving a request. However, conventional systems may surface or indicate information, such as model results, without regard to the privacy of the information in the underlying source data set.

DETAILED DESCRIPTION

Figure 1:
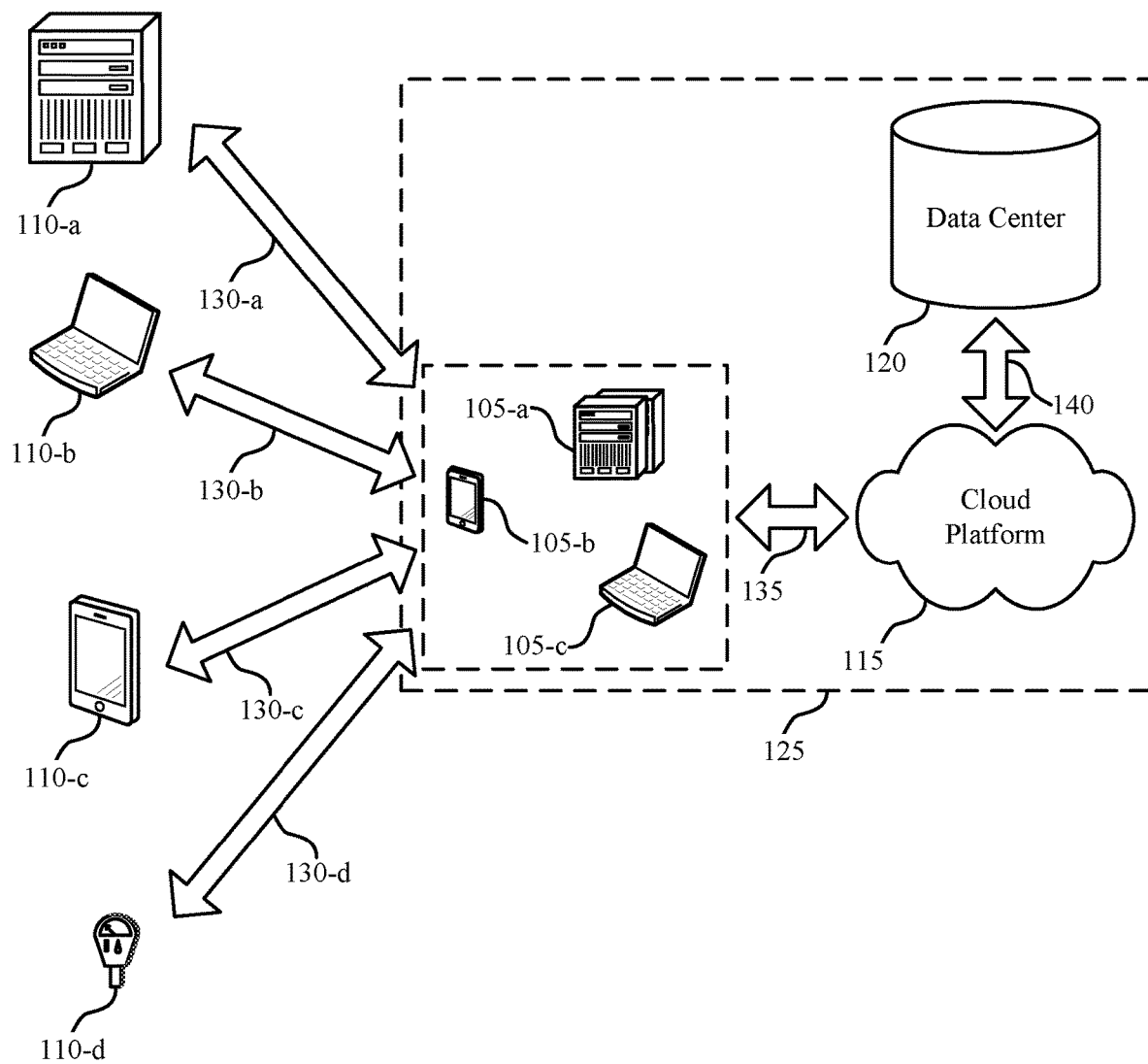
FIG. 1 illustrates an example of a system for running an artificial intelligence model at a server that supports security for private data inputs to artificial intelligence models in accordance with aspects of the present disclosure.

Some systems (e.g., artificial intelligence systems supporting customer relationship management (CRM) and one or more datasets) may support a user-friendly, interactive data analytics application. Such an application may receive a request to run one or more artificial intelligence models on different data sets. As one example, a user may input a request to run an artificial intelligence model into a data analytics application running on a user device. In some cases, the data analytics application on the user device may transmit the request to a server (such as an application server). The server, upon receiving the request, may identify one or more data sets associated with the request. Often times, the privacy of one or more data sets (such as one or more sources of information) may be of concern. Conventional systems may not consider privacy implications of the source information when running an artificial intelligence model and returning the results of the artificial intelligence model. It may therefore be desirable to develop a more robust artificial intelligence model that provides confidentiality to the sources of information.

According to one or more aspects of the present disclosure, a device (e.g., a user device, server, server cluster, database, etc.) may perform any combination of the following techniques and procedures to provide security for private data inputs to artificial intelligence models. Specifically, the device may implement a series of algorithms that can apply and evaluate artificial intelligence model results in an iterative fashion. For example, the artificial intelligence system may receive a request (such as a request from a user using an analytics application) to run an artificial intelligence model. Upon receiving the request, the artificial intelligence system may identify a known data set (such as a data set including data that is public) and may run an artificial intelligence model on the known data set to determine a first set of outcomes. In an example, the user may indicate a context within the request, and the artificial intelligence system may identify the known data set based on the context.

Such an artificial intelligence system may be used, for example, by a clinician. In such an example, the clinician may monitor a patient and may submit known information about the patient to the artificial intelligence system for evaluation. The clinician may choose to run the artificial intelligence system prior to an appointment with the patient. Upon receiving the known information (or a request including or indicating the known information), the artificial intelligence system may identify a known data set for running the artificial intelligence model. In some cases, the known data set may include information without any privacy concerns or information already known to the user of the artificial intelligence system. The artificial intelligence system in this example, may run the artificial intelligence model on the known data set. Additionally, the artificial intelligence system (such as the artificial intelligence system residing on a server) may run the artificial intelligence model on a more extensive data set including the public data as well as private data. In some cases, "public" data may refer to data without privacy concerns, data already known to the artificial intelligence system user, or a combination thereof, such that implicitly or explicitly indicating this public data to the user does not result in a data breach. Private data may include data having confidentiality implications. In this example of the clinician and the patient, the private data may include police reports, iPhone Health Kit data, notes from a therapist, location data, or other sensitive or private information. The artificial intelligence system may determine a second set of outcomes from rerunning the artificial intelligence model on the extended set of data (such as data including public data and well as private data). Additionally, such artificial intelligence models may ensure low probability of a user (such as the clinician) working backwards to deduce private source information from the artificial intelligence model results.

According to one or more aspects of the present disclosure, an artificial intelligence system may compare a first set of outcomes with a second set of outcomes. As previously discussed, the first set of outcomes may be generated as a result of running the artificial intelligence model on a set of public data, and the second set of outcomes may be generated as a result of rerunning the artificial intelligence model on an extended set of data. In some cases, the artificial intelligence system may evaluate the comparison results to determine if the first set of outcomes is the same as the second set of outcomes. Additionally, the artificial intelligence system may determine whether a difference between the first set of outcomes and the second set of outcomes satisfies a statistical threshold. For example, the artificial intelligence system may determine whether the first set of outcomes has a statistically insignificant difference from the second set of outcomes. In some aspects, if the comparison results indicate that the first set of outcomes and the second set of outcomes are similar (or have a statistically insignificant difference), then the artificial intelligence system may report the result (i.e., the second set of outcomes) to a requestor. In an alternative example, where the first set of outcomes is different from the second set of outcomes, the artificial intelligence system may evaluate whether a private data value from the set of private data is identifiable based on the second set of outcomes (such as the outcomes of rerunning the artificial intelligence model on an extended data set). If a private data value is identifiable based on the second set of outcomes, then the artificial intelligence system may not provide the second set of outcomes to the requestor. In some cases, if a private data value is identifiable based on the second set of outcomes, then the artificial intelligence system may obfuscate the second set of outcomes prior to transmitting the second set of outcomes to the requestor. In this way, the artificial intelligence system ensures that the difference between the two sets of outcomes may not be directly attributed to only one private data value (i.e., the one private data point driving the difference between the outcomes), effectively protecting this private data value against discovery by the artificial intelligence system user. According to one or more aspects, the artificial intelligence system may instead send the first set of outcomes or may send an indication for the requestor to perform additional analysis.

A user may use this artificial intelligence model for data analysis and predictive purposes, where the features included in this model ensure that the outcomes of the model cannot be attributed to a specific private data value.

Aspects of the disclosure are initially described in the context of an environment supporting security for private data inputs to artificial intelligence models. Additional aspects are described with reference to privacy ensuring procedures, systems that support security for private data inputs to artificial intelligence models, and a process flow. Aspects of the disclosure are further illustrated by and described with reference to apparatus diagrams, system diagrams, and flowcharts that relate to providing security for private data inputs to artificial intelligence models.

FIG. 1 illustrates an example of a system 100 for running an artificial intelligence model at a server that supports security for private data inputs to artificial intelligence models in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things.

Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

A device (e.g., any component of subsystem 125, such as a cloud client 105, a server or server cluster associated with the cloud platform 115 or data center 120, etc.) may perform any combination of the following techniques and procedures to provide security for private data inputs to artificial intelligence models. For example, the device (e.g., a user device, server, server cluster, database, etc.) may receive a request to run an artificial intelligence model, and upon receiving the request, the device may run the artificial intelligence model. The device may determine one or more results upon running the artificial intelligence model. In some cases, the device may be configured to simultaneously handle requests from multiple users. The device may determine the results from multiple artificial intelligence models, and the device may then evaluate the results in an iterative fashion. For example, the device (such as an application server) may receive a request from a user using an analytics application running on a user device. In some cases, the user may request to run an artificial intelligence model. Upon receiving the request, the device may identify a known data set (such as a data set including public data), and may run an artificial intelligence model on the known data set to determine a first set of outcomes. In some examples, the device may run the artificial intelligence model on an extended data set. In some cases, the extended data set may include the public data as well as private data. Private data may include data having confidentiality implications. The device may determine a second set of outcomes from rerunning the artificial intelligence model on the extended set of data. Upon determining the first set of outcomes and the second set of outcomes, the device may compare the first set of outcomes with the second set of outcomes. The device may then evaluate the comparison results to determine whether the first set of outcomes is the same as the second set of outcomes. Additionally, the device may determine whether a difference between the first set of outcomes and the second set of outcomes satisfies a statistical threshold. That is, the device may determine whether the first set of outcomes has a statistically insignificant difference from the second set of outcomes.

In some aspects, if the comparison results indicate that the first set of outcomes and the second set of outcomes are similar (or statistically similar), then the device may report the second set of outcomes to a user. In some cases, the device may transmit the second set of outcomes as a set of results. Alternatively, if the comparison results indicate that the first set of outcomes is different from the second set of outcomes (or the difference is statistically significant), then the device may evaluate whether a private data value (e.g., a particular risk factor) is identifiable based on the second set of outcomes. That is, the device may determine whether a user may be able to derive one particular private data value upon receiving the second set of outcomes (such as the outcomes of running the artificial intelligence model on the extended data set). If the device determines that a particular private data value is identifiable (e.g., the difference can be attributed to a specific risk factor, rather than possibly being attributed to multiple different or combined risk factors), then the device may not provide the second set of outcomes to the user (such as the requestor). In some cases, if a private data value is identifiable based on the second set of outcomes, then the device may obfuscate the second set of outcomes prior to transmitting the second set of outcomes to the user (or requestor). That is, the device ensures that the difference between the two sets of outcomes may not be directly attributed to only one private data value.

Some conventional systems may implement data analytics applications that do not sufficiently consider privacy implications of the source data. For example, many data analytics applications receive a request to run artificial intelligence models on different data sets. A user may input a request to run an artificial intelligence model. However, upon receiving the request, conventional systems may run artificial intelligence models on source data sets without fully considering the privacy of the source data sets. That is, even if the systems consider the security of the source data sets when storing the source data and executing the artificial intelligence models on the source data, these existing systems do not consider privacy implications of the source information when returning the results of an artificial intelligence model to the requestor. This can result in inadvertently exposing sensitive information within the conventional system, even if the system securely handles the source information when running the artificial intelligence model on the information. A user can receive the results and, despite never viewing or receiving the sensitive information, may deduce sensitive information based on the received results of the artificial intelligence model. This security issue may be especially problematic if the data analytics application is implemented at a clinician's office. With concerns about privacy and multiple sources of information, it is desirable to provide sufficient confidentiality to the source information. That is, it is desirable to develop a more robust artificial intelligence model that ensures low probability of deducing private information from a set of results.

In contrast, system 100 implements procedures and techniques for providing security for private data inputs to artificial intelligence models while also ensuring low probability of a user working backwards to deduce private source information from the artificial intelligence model results.

For example, the system 100 supports a series of algorithms that can apply and iteratively evaluate results received from running the artificial intelligence models, such that a requestor is not able to deduce confidential source information from the results received from running the artificial intelligence models. The system 100 may evaluate a level of difference between the results received from running the artificial intelligence model during a first iteration and the results received from running the artificial intelligence model during a second iteration to ensure that the difference between the two sets of results may not be directly attributed to only one private input (such as a private data value that was used as a source information). Additionally, if the system 100 determines that the difference may be attributed to a single private data value, then the system 100 may obfuscate the results to ensure privacy of the source information.

In one example, the system 100 may identify that a teenage patient has missed school. When running the artificial intelligence model, the system 100 may determine that there are no observed correlations between missed school and health issues for that patient.

However, if no absences had been previously identified, the system 100 may compare data identified for other children of similar age, location, health, etc. to data identified for the patient and determine if a missed class is related to heath issues based on other similar children. If the system 100 determines that a missed class has been identified as being related to heath issues in other children, then the system 100 may determine a result indicating that a clinician should investigate health issues for the teenage patient. On the other hand, if the system 100 determines that a missed class has not been identified as being related to heath issues in other children, then the system 100 may determine a result indicating that a clinician should not investigate health issues for the teenage patient. In some cases, the system 100 may request the clinician to provide additional information related to the teenage patient. The system 100 may then determine a recommendation for the clinician based on the additional information.

In another example, system 100 may be implemented for a clinician (such as a health professional, psychologist, etc.). In such an example, the clinician may monitor a patient and may submit known information about the patient to the system 100 for evaluation. The clinician may choose to run the artificial intelligence model prior to an appointment with the patient. In one example, the clinician may indicate details associated with the patient in the request. Upon receiving the request, the system 100 may identify public data sets (such as public data sources) and private data sets (such as private data sources) associated with the patient. In this example, the public data sets may include notes taken at the clinician's office. The private data sets may include police reports, iPhone Health Kit, notes from therapist (other than the clinician running the request), location data, credit card information, etc. As one example, if the system 100 identifies that an incident where police have been called in suspected abuse (not involving the patient), then system 100 includes the incident in the private data set (i.e., the system 100 infers that the incident cannot be reported directly to the clinician). Upon running the artificial intelligence model on the public data set as well as on an extended data set including public data as well as private data, the system 100 may compare the sets of results to ensure that the difference between the two sets of results may not be directly attributed to only one private input. In the prior example where the private data set includes an incident involving the police, the system 100 may determine a result indicating that the patient should continue counseling. In such a case, the system 100 may determine whether the clinician can derive any one of the private data values (for example, the police report) based on the result. If a private data value is identifiable based on the results, then the system 100 may obfuscate the results prior to transmitting them to the clinician. This would allow the patient to keep their confidential information private but help the clinician increase confidence in proceeding with counseling.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
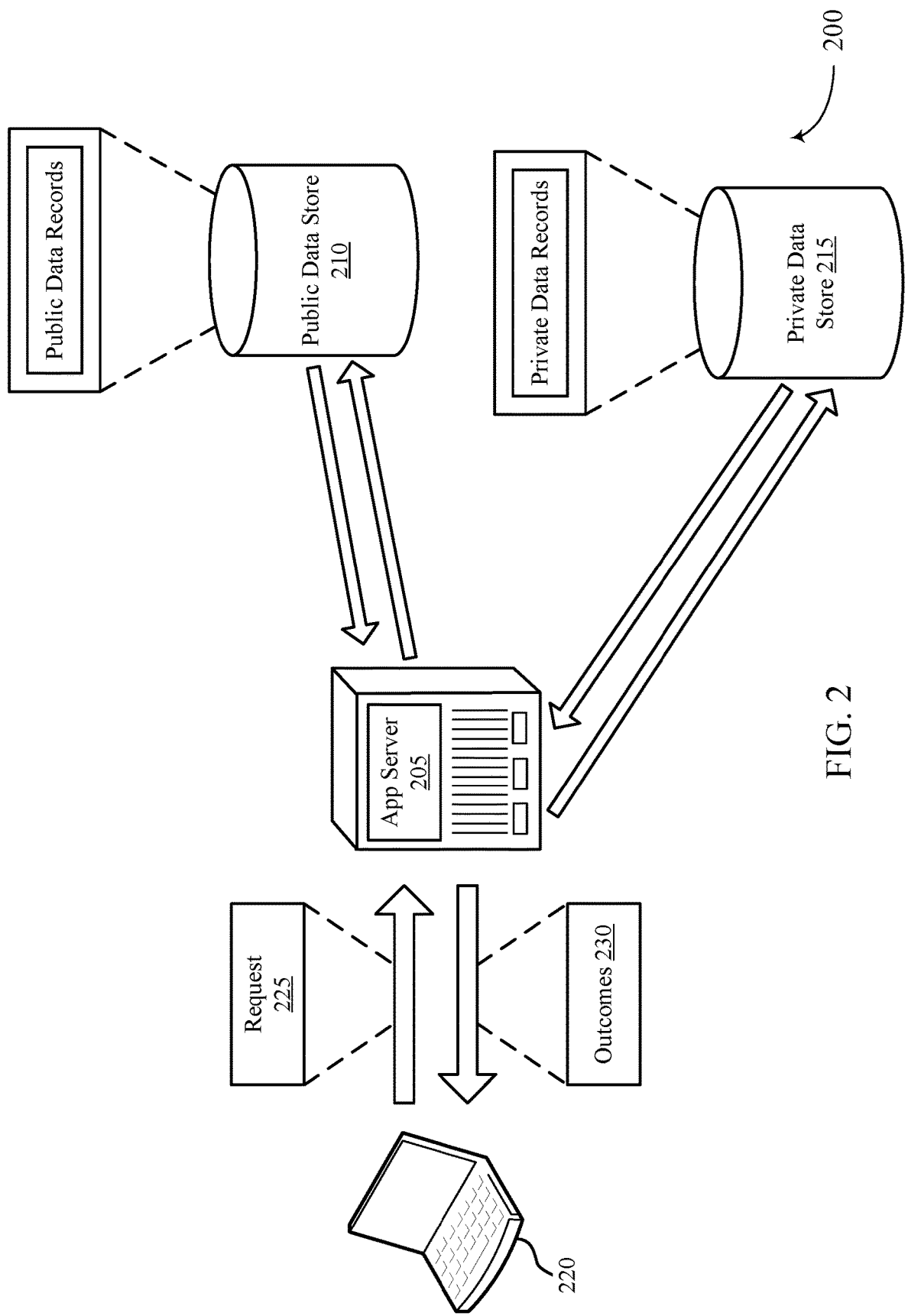
FIG. 2 illustrates an example of a system that supports security for private data inputs to artificial intelligence models in accordance with aspects of the present disclosure.

FIG. 2 illustrates an example of a system 200 that supports security for private data inputs to artificial intelligence models in accordance with aspects of the present disclosure. The system 200 may include an application server 205 (e.g., a device), a public data store 210, a private data store 215, and a user device 220. In some cases, the functions performed by the application server 205 may instead be performed by a component of the private data store 210, the public data store 215, or the user device 220. The user device 220 may support an application for data analytics. Specifically, the user device 220 in combination with the application server 205 may support an application that provides security for private data inputs in artificial intelligence models. A user operating the user device 220 may interact with the application to run an artificial intelligence model at the application server 205, where the application server 205 may identify outcomes 230 of the artificial intelligence model and may provide the outcomes 230 to the user device 220.

The user device 220 may display an interactive interface for receiving a request 225 to run an artificial intelligence model. In some cases, this interface may run as a webpage within a web browser (e.g., as a software as a service (SaaS) product). In other cases, this interface may be part of an application downloaded onto the user device 220. A user operating the user device 220 may input information into the user interface to specify aspects of the request 225 to run an artificial intelligence model. As one example, the user device 220 hosting an application for running an artificial intelligence system may be implemented in an office of a psychologist. A psychologist (such as a user operating the user device 220) may submit known information about a patient to the user device 220 for evaluation prior to an appointment with the patient. For example, the psychologist may run the artificial intelligence model to determine whether to continue counseling the patient. In some cases, a user (such as the psychologist) may be associated with a user credential or user identifier (ID), and the user may log on to the user device 220 using the user credential. For example, if a user is part of a specific organization, the application server 205 may identify the organization using the user credential, and may run the artificial intelligence model on the public data store 210 and the private data store 215 associated with that organization. In some cases, the application server 205 may run the artificial intelligence model on the public data store 210 associated with that organization and an extended data set associated with that organization, the extended data set including the public data store 210 and the private data store 215. In this way, the application server 205 may provide results of running the artificial intelligence model, while ensuring data security and privacy of source information based on the results.

Based on the user input received from a user operating user device 220 (such as one or more files containing patient notes input by a psychologist prior to an appointment with a patient), the application server 205 may identify a known data set (such as a data set including data that is public) from the public data store 210. In some examples, the application server 205 may identify a context associated with the request 225 (such as using the user credential received in the request 225), and may identify the known data set from the public data store 210 based on the context. Upon identifying the known data set from the public data store 210, the application server 205 may run an artificial intelligence model on the known data set. In some cases, the application server 205 may determine a first set of outcomes based on running the artificial intelligence model on the known data set. In some cases, the application server 205 may identify an extended data set from the public data store 210 and the private data store 215. The application server 205 may identify the extended data set based on the context determined using the request 225. For example, the extended data set may include a more extensive data set including the public data as well as private data. In some cases, private data may include data having confidentiality implications. In this example of the psychologist, the private data may include police reports, iPhone Health Kit data, notes from a therapist, location data, or other sensitive or private information. The application server 205 may run the artificial intelligence model on the extended data set (such as data including public data from the public data store 210 as well as private data from the private data store 215) and may determine a second set of outcomes. In the example of the psychologist, the second set of outcomes may be a set of recommendations for the psychologist based on the public data and the private data. That is, the second set of outcomes may indicate whether the psychologist should continue counseling a patient. Additionally or alternatively, the second set of outcomes may include flags, scores, percentages, etc. associated with the recommendations based on the results of the artificial intelligence model.

Upon determining the first set of outcomes and the second set of outcomes, the application server 205 may compare the first set of outcomes with the second set of outcomes. In some cases, the application server 205 may evaluate the comparison results to determine if the first set of outcomes is the same as or statistically the same as the second set of outcomes. That is, even if the first of outcomes are different from the second set of outcomes, the application server 205 may determine whether a difference between the first set of outcomes and the second set of outcomes satisfies a statistical threshold. For example, the application server 205 may determine whether the first set of outcomes has a statistically significant difference from the second set of outcomes.

In a first example, if the comparison results indicate that the first set of outcomes and the second set of outcomes are similar (or have a statistically insignificant difference), then the application server 205 may report the result (that is, the second set of outcomes 230 based on the extended data set) to the user operating the user device 220. In a second example, where the first set of outcomes is different (or has a statistically significant difference) from the second set of outcomes, the application server 205 may evaluate whether a private data value from the private data store 215 is identifiable based on the second set of outcomes. For example, the application server 205 may ensure low probability of a user (such as the psychologist) working backwards to deduce private data related to the patient from the outcomes. If a private data value is not identifiable based on the second set of outcomes, then the application server 205 may report the result (or the second set of outcomes 230) to the user operating the user device 220. However, if a private data value is identifiable based on the second set of outcomes then the application server 205 may not provide the second set of outcomes to the user. Instead, the application server 205 may obfuscate the second set of outcomes prior to transmitting the second set of outcomes to the user. In such a case, the application server 205 may transmit the obfuscated outcomes 230 to the user device 220. Alternatively, the application server 205 may send the first set of outcomes 230 to the user device 220 (e.g., if the second set of outcomes could potentially indicate a specific private data point). The application server 205 may send the outcomes 230 to the user device 220 for display in a user interface. This may allow a user to receive the outcomes 230 in response to a request 225 while ensuring that the outcomes 230 cannot to attributed to a single private data value.

Figure 3:
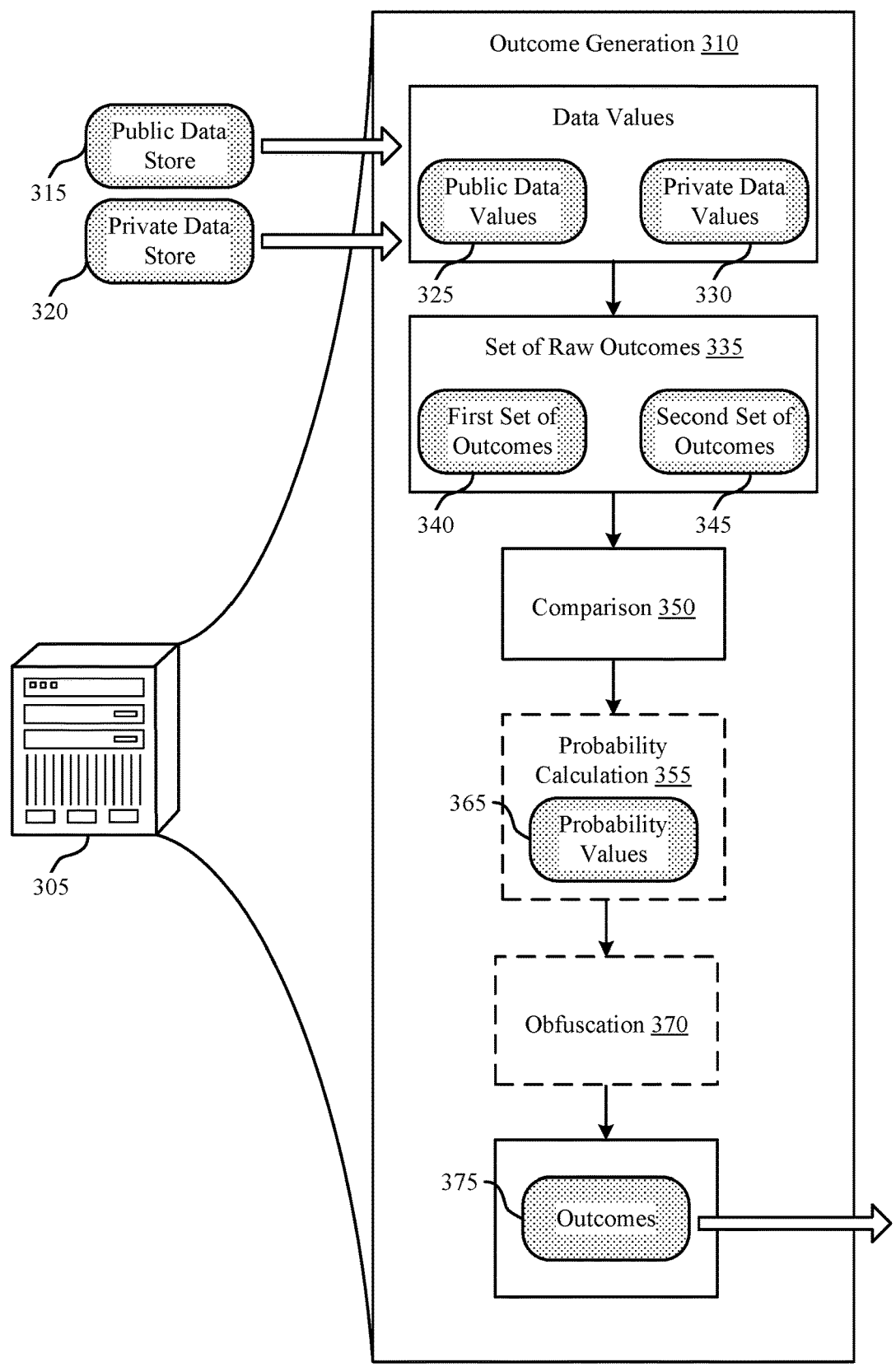
FIG. 3 illustrates an example of a privacy ensuring procedure that supports security for private data inputs to artificial intelligence models in accordance with aspects of the present disclosure.

FIG. 3 illustrates an example of a privacy ensuring procedure 300 that supports security for private data inputs to artificial intelligence models in accordance with aspects of the present disclosure. The privacy ensuring procedure 300 may be performed by a device 305, such as a server (e.g., an application server, a database server, a server cluster, a virtual machine, a container, etc.). Although not shown in FIG. 3, the privacy ensuring procedure 300 may be performed by a user device, a data store, or some combination of these or similar devices. In some cases, the device 305 may be a component of a subsystem 125 as described with reference to FIG. 1. The device 305 may perform outcome generation 310 to generate outcomes 375 based on a received request (not shown). For example, using a number of techniques, the device 305 may run an artificial intelligence model and may determine the outcomes 375 to provide to a user. In some cases, a device 305 may implement all of the techniques described herein to perform outcome generation 310 while ensuring privacy of confidential source data. In other cases, the device 305 may implement a subset of the described techniques or may implement additional techniques to support outcome generation 310.

The device 305 may support computer aided data science, which may be performed by an artificial intelligence-enhanced data analytics framework. In a first example, the device 305 may run an application for artificial intelligence-enhanced data analytics (e.g., in a webpage of a web browser). In a second example, the device 305 may perform backend processing for artificial intelligence-enhanced data analytics. Artificial intelligence-enhanced data analytics may support user interaction via a user interface. In some cases, a user may guide or provide inputs for a data analysis procedure, and the device 305 may perform the analytics and determine findings (such as outcomes 375) for display. These outcomes 375 may ensure low probability of a user working backwards to deduce private source information used to derive the outcomes 375.

The device 305 may be an example of a general analysis machine and, as such, may perform data analytics and outcome generation based on receiving a request from a user. The device 305 may receive a request to run an artificial intelligence model. In some examples, the device 305 may receive the request from a user device (such as a user device separate from device 305). The user device may receive the request on an interactive interface. This interface may run as a webpage within a web browser, or the interface may be part of an application downloaded onto the user device. The request to run an artificial intelligence model may include information inputted by a user into a user interface. For example, the user may specify aspects of the request to run an artificial intelligence model. As one example, a user operating the user device may be a health professional. The health professional may submit a request to run an artificial intelligence model prior to an appointment with a patient. In one example, the health professional may submit known information about the patient. Upon receiving the request, the user device may forward the request to an application server (i.e., the device 305) for backend processing. Upon receiving the request, the device 305 may identify a context associated with the request and may run the artificial intelligence model based on the context.

First, the device 305 may identify a public data store 315 and a private data store 320 associated with the request. For example, the public data store 315 may include public data from one or more public data sources and the private data store 320 may include private data from one or more private data sources. In some examples, the device 305 may identify a data feed associated with the public data store 315. In some cases, the device 305 may run the artificial intelligence model on one or more public data values 325 (e.g., a known data set) identified from the public data store 315. For example, the device 305 may run the artificial intelligence model on the data feed associated with the public data store 315. Additionally, the device 305 may identify an extended data set associated with the request. In one example, the extended data set may include the public data store 315 and the private data store 320 associated with the request. In some examples, the device 305 may identify a data feed associated with the private data store 320. The device 305 may run the artificial intelligence model on the one or more public data values 325 (e.g., the known data set) identified from the public data store 315 and one or more private data values 330 identified from the private data store 320. That is, the device 305 may run the artificial intelligence model on the data feed associated with the public data store 315 and the data feed associated with the private data store 320.

As described in the example of FIG. 3, the device 305 may run the artificial intelligence model on the public data values 325 identified from the public data store 315 to determine a first set of outcomes 340. Additionally, the device 305 may run the artificial intelligence model on the one or more public data values 325 identified from the public data store 315 and one or more private data values 330 identified from the private data store 320 (or the data values of an extended data set). The device 305 may run the artificial intelligence model on the extended data set and may determine a second set of outcomes 345. The first set of outcomes 340 and second set of outcomes 345 may be considered as a set of raw outcomes 335. Upon determining the set of raw outcomes 335, the device 305 may perform a comparison 350 on the first set of outcomes 340 with the second set of outcomes 345. In some cases, the device 305 may determine whether the first set of outcomes 340 is the same as the second set of outcomes 345. In some examples, the device 305 may determine whether the first set of outcomes 340 is statistically similar to the second set of outcomes 345. The device 305 may determine whether a difference between the first set of outcomes 340 and the second set of outcomes 345 satisfies a statistical threshold. The device 305 may evaluate whether the difference between the first set of outcomes 340 and the second set of outcomes 345 is statistically significant.

In some examples, if the comparison results indicate that the first set of outcomes and the second set of outcomes are similar (or have a statistically insignificant difference), then the device 305 may transmit the second set of outcomes 345 to a user device. For example, the device 305 may transmit the second set of outcomes 345 to the user device operated by a health professional. The second set of outcomes may indicate whether the health professional should continue counseling of a patient. In an alternative example, the second set of outcomes may indicate a time period for which the health professional should continue counseling of the patient. If the second set of outcomes and first set of outcomes are similar, surfacing the second set of outcomes may not implicitly indicate any underlying private source data, as a user receiving the results may not be able to determine whether private data was used in generating the results.

In some examples, the device 305 may determine that the difference between the first set of outcomes 340 and the second set of outcomes 345 satisfies a statistical threshold. In such examples, the device 305 may perform a probability calculation 355 to evaluate whether a private data value (such as a private data value from the one or more private data values 330) is identifiable from the second set of outcomes 345. The device 305 may calculate a probability of identifying at least one private data value from the one or more private data values 330 based on the difference between the first set of outcomes 340 and the second set of outcomes 345 satisfying the statistical threshold. In some examples, the device 305 may calculate a probability value 365, and if the probability value 365 satisfies a threshold value, then the device 305 may determine that the private data value is identifiable. In an example where the second set of outcomes indicates that the health professional should continue counseling of a patient, the device 305 may determine whether the health professional can deduce which private data value (such as police reports, iPhone Health Kit data, notes from a therapist, location data, or other sensitive or private information) caused the artificial intelligence model to determine the second set of outcomes.

If the device 305 determines that a private data value is identifiable, then the device 305 may not provide the second set of outcomes 345 to a user. In some cases, the device 305 may obfuscate 370 the second set of outcomes 345 prior to transmitting the second set of outcomes 345 (as outcomes 375) to the user. In such a case, the device 305 may transmit the obfuscated outcomes (as outcomes 375) to the user (such as to a user device). For example, the device 305 may transmit an extended set of results (as outcomes 375 including additional outcomes) to the user. In some cases, the device 305 may determine that the health professional may not be able deduce which private data value (such as police reports, iPhone Health Kit data, notes from a therapist, location data, or other sensitive or private information) caused the artificial intelligence model to determine the extended set of results (as outcomes 375). In one example, the device 305 may not transmit the second set of outcomes 345 and instead may send the first set of outcomes 340 (as outcomes 375) to the user. By modifying the results sent to the user, the artificial intelligence system may remove any implicit indications of underlying private source data, such that a user receiving the results may not be able to determine what private data was used in generating the results.

Figure 4:
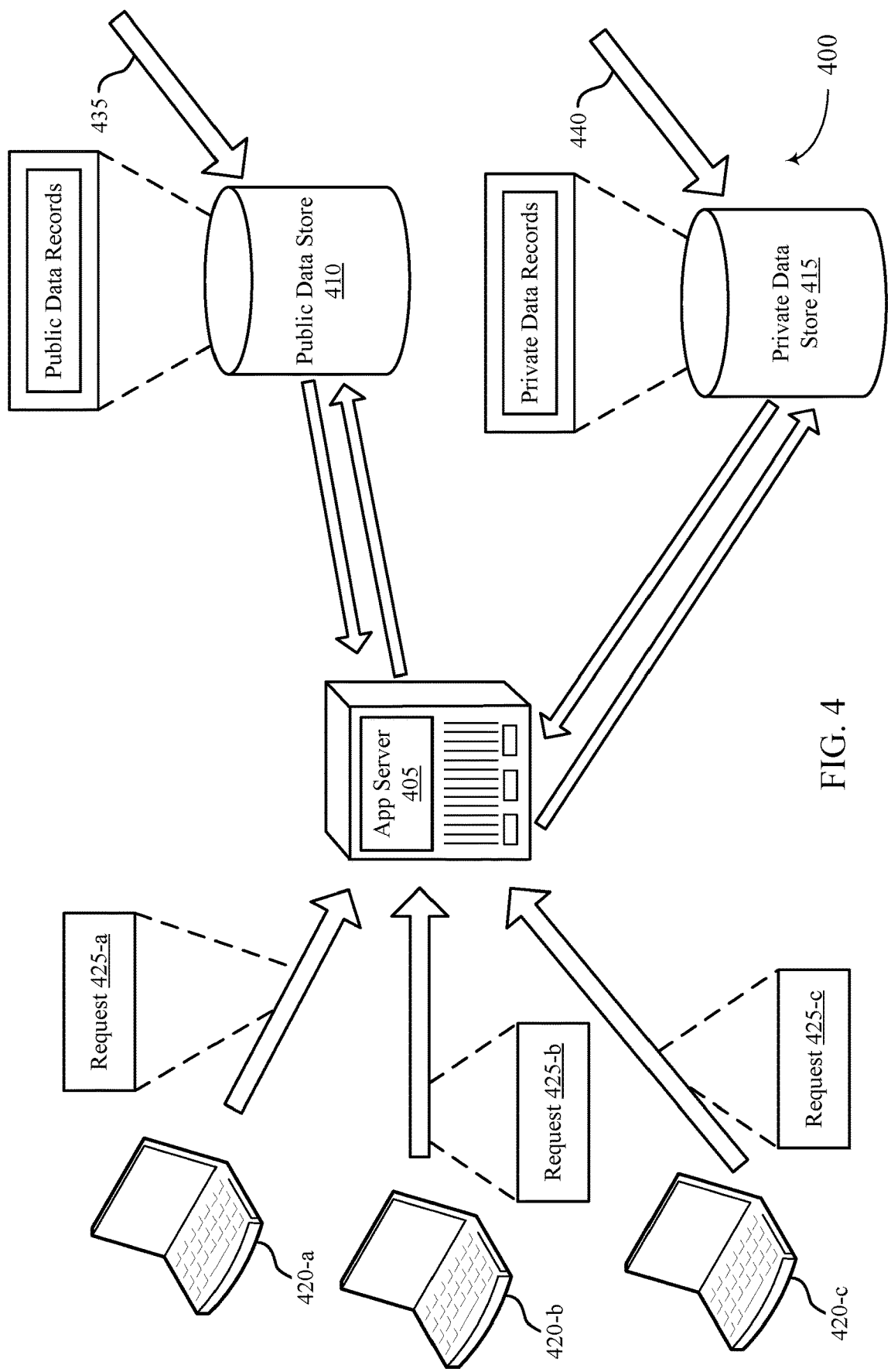
FIG. 4 illustrates an example of a system that supports security for private data inputs to artificial intelligence models in accordance with aspects of the present disclosure.

FIG. 4 illustrates an example of a system 400 that supports security for private data inputs to artificial intelligence models in accordance with aspects of the present disclosure. The system 400 may include an application server 405 (e.g., an application server 205 as described with reference to FIG. 2), a public data store 410, a private data store 415, user device 420-a, user device 420-b, and user device 420-c. In some cases, the functions performed by the application server 405 may instead be performed by a component of the private data store 410, the public data store 415, or one or more of the user devices 420. The user devices 420 may support an application for data analytics. Specifically, the user devices 420 in combination with the application server 405 may support an application that provides security for private data inputs in artificial intelligence models.

According to one or more aspects of the present disclosure, an artificial intelligence model may be trained on a public data set from one or more public data sources, on a private data set from one or more private data sources, or on a combination of these. In some cases, the artificial intelligence model may be trained using supervised machine learning (such as using historical data with tagged/known outcomes), unsupervised machine learning, or a combination of both. In some examples, the private data set from one or more private data sources used to train the artificial intelligence model may be anonymized during the training procedure. In some cases, a first artificial intelligence model may be trained on a public data set from one or more public data sources, and a second artificial intelligence model may be trained on a private data set from one or more private data sources. Additionally or alternatively, a first artificial intelligence model may be trained on a public data set, and a second artificial intelligence model may be trained on an extended data set (including both public data and private data). In an example, different artificial intelligence models may be trained for different users (such as different clinicians), different organizations, different contexts, etc. In another example, a common artificial intelligence model may be trained and shared across different users, different organizations, different contexts, etc. The artificial intelligence model may be trained offline (i.e., the artificial intelligence model may be pre-configured). Additionally or alternatively, the artificial intelligence model may be trained in real-time. In such cases, the artificial intelligence model may be updated periodically, aperiodically, or instantaneously based on new requests, updates to the one or more public data sources, updates to the one or more private data sources, etc. The trained artificial intelligence model may be stored in an application server 405 and may be accessed using the user devices 420.

The user devices 420 may each include an interactive interface for receiving requests 425. In some cases, the interactive interface may run as a webpage within a web browser hosted at a user device 420. In some cases, the user devices 420 may receive requests 425 to run artificial intelligence models. The user devices 420 may forward the received requests 425 to the application server 405. In one example, a first user operating the user device 420-a may input a request 425 to run a first artificial intelligence model and a second user operating the user device 420-b may input a request 425 to run a second artificial intelligence model. In one example, a psychologist may input two separate requests relating to two different patients. The user device 420-a may forward the first request 425-a and the user device 420-b may forward the second request 425-b to the application server 405. The application server 405 may process each request 425 and may run the first artificial intelligence model and the second artificial intelligence model in parallel. In this example, the psychologist may use two separate user devices 420 to run the artificial intelligence models. Alternatively, the psychologist may use a single user device 420 to run the artificial intelligence models relating to two different patients. In one example, the application server 405 may run the same artificial intelligence model for both patients. Alternatively, the application server 405 may run separate artificial intelligence models for the patients.

In one example, the application server 405 may identify a public data store 410 and a private data store 415. In some examples, the application server 405 may identify a set of data from the public data store 410 and may run the artificial intelligence model on the identified set of data (such as a known set of data). The application server 405 may identify a separate known data set specific to each received request 425 (such as the requests received from different user devices 420). In some cases, the application server 405 may determine a first set of outcomes based on running the artificial intelligence model on the known data set. In some examples, the application server 405 may identify a first correlation between one or more public data values of the public data store 410 and the first set of outcomes. The application server 405 may determine the first set of outcomes based on the identified correlation.

In some cases, the application server 405 may run the artificial intelligence model on one or more set of data from an extended data set. In some cases, the extended data set may include the public data store 410 and the private data store 415. In one example, the application server 405 may receive a request 425 and may identify the extended data set based on the received request 425. For example, based on the request 425, the artificial intelligence system may determine (e.g., based on a particular artificial intelligence model) relevant private data or private databases and may retrieve relevant confidential information from these data sources. The confidential information may be securely stored at the application server 405 (e.g., in non-persistent memory) for inputting into the artificial intelligence model and may be flushed from memory following the model analysis. Upon running the artificial intelligence model on the extended data set (such as data including public data from the public data store 410 as well as private data from the private data store 415), the application server 405 may determine a second set of outcomes. In some examples, the application server 405 may identify a second correlation between one or more private data values of the private data store 415 and the second set of outcomes. The application server 405 may determine the second set of outcomes based on the second correlation. According to one or more aspects, the application server 405 may compare the first set of outcomes with the second set of outcomes. In some cases, the application server 405 may evaluate the comparison results to determine if the first set of outcomes is the same as or statistically the same as the second set of outcomes. That is, the application server 405 may determine whether the first set of outcomes has a statistically insignificant difference from the second set of outcomes.

In a first example, if the comparison results indicate that the first set of outcomes and the second set of outcomes are similar (or have a statistically insignificant difference), then the application server 405 may report the second set of outcomes to the user operating on the user device 420. In some cases, the application server 405 may transmit the second set of outcomes to the user device 420. In a second example, where the first set of outcomes is different (or statistically different) from the second set of outcomes, the application server 405 may evaluate whether a single private data value is identifiable based on the second set of outcomes. That is, if a user receives the second set of outcomes and can deduce the reason (e.g., a particular private data value) for receiving the second set of outcomes rather than the first set of outcomes, the security of this particular private data value would be compromised based on the second set of outcomes. In such a case, to maintain security for the private data inputs, the application server 405 may not return the second set of outcomes to the user.

If the application server 405 determines that a private data value is not identifiable based on the second set of outcomes, then the application server 405 may report the second set of outcomes to the user devices 420. Alternatively, if the application server 405 determines that a private data value is identifiable based on the second set of outcomes, then the application server 405 may not provide the second set of outcomes to the user (such as to the user device 420). The application server 405 may implement one or more rules (e.g., business rules) to determine a level of risk associated with sharing the second set of outcomes with the user. Also, the application server 405 may determine whether to transmit the second set of outcomes to a different user (such as a senior employee having authorization to review the second set of outcomes).

In some examples, the application server 405 may obfuscate the second set of outcomes prior to transmitting the second set of outcomes to the user. In some cases, instead of returning the second set of outcomes, the application server 405 may return a result that includes more outcomes (or possible courses of action) than the second set of outcomes. In an example where the second set of outcomes includes a recommendation, the application server 405 may generalize the second set of outcomes by decreasing a specificity of the recommendation. For example, the application server 405 may obfuscate the second set of outcomes to ensure that a single private data value is not derivable from the second set of outcomes. The application server 405 may transmit the obfuscated outcomes to the user device 420.

As previously discussed, the application server 405 may determine a set of outcomes for each request and may simultaneously transmit each set of outcomes to the user devices 420. In some examples, the application server 405 may receive an update 435 to the public data store 410. In some cases, the update may include addition or deletion of at least one public data value to or from the public data store 410. For example, the application server 405 may identify that a new public data value is available, and the application server 405 may modify the first correlation based on the update to the public data store 410. Additionally or alternatively, the application server 405 may receive an update 440 to the private data store 415 (such as an extended data set). In some cases, the update may include addition or deletion of at least one private data value to or from the private data store 415. In such cases, the application server 405 may modify the second correlation based on the update to the private data store 415. These updates may occur in real time or pseudo-real time, or the updates may occur based on periodic or aperiodic batch processing.

According to one or more aspects, the application server 405 may receive a request for the update to the extended data set. For example, the application server 405 may receive a request for the update to the public data store 410 and the private data store 415. The application server 405 may receive the request from a user device 420. Upon receiving the request, the application server 405 may transmit a notification indicating the update to the extended data set (such as an update to the public data store 410 and the private data store 415). In some examples, the application server 405 may initiate a process (e.g., a business process) to determine that the update includes addition or deletion of a threshold number of private data values to or from the extended data set. Upon determining that the update includes addition or deletion of the threshold number of private data values to or from the extended data set, the application server 405 may transmit a notification indicating the update to the user device 420.

Figure 5:
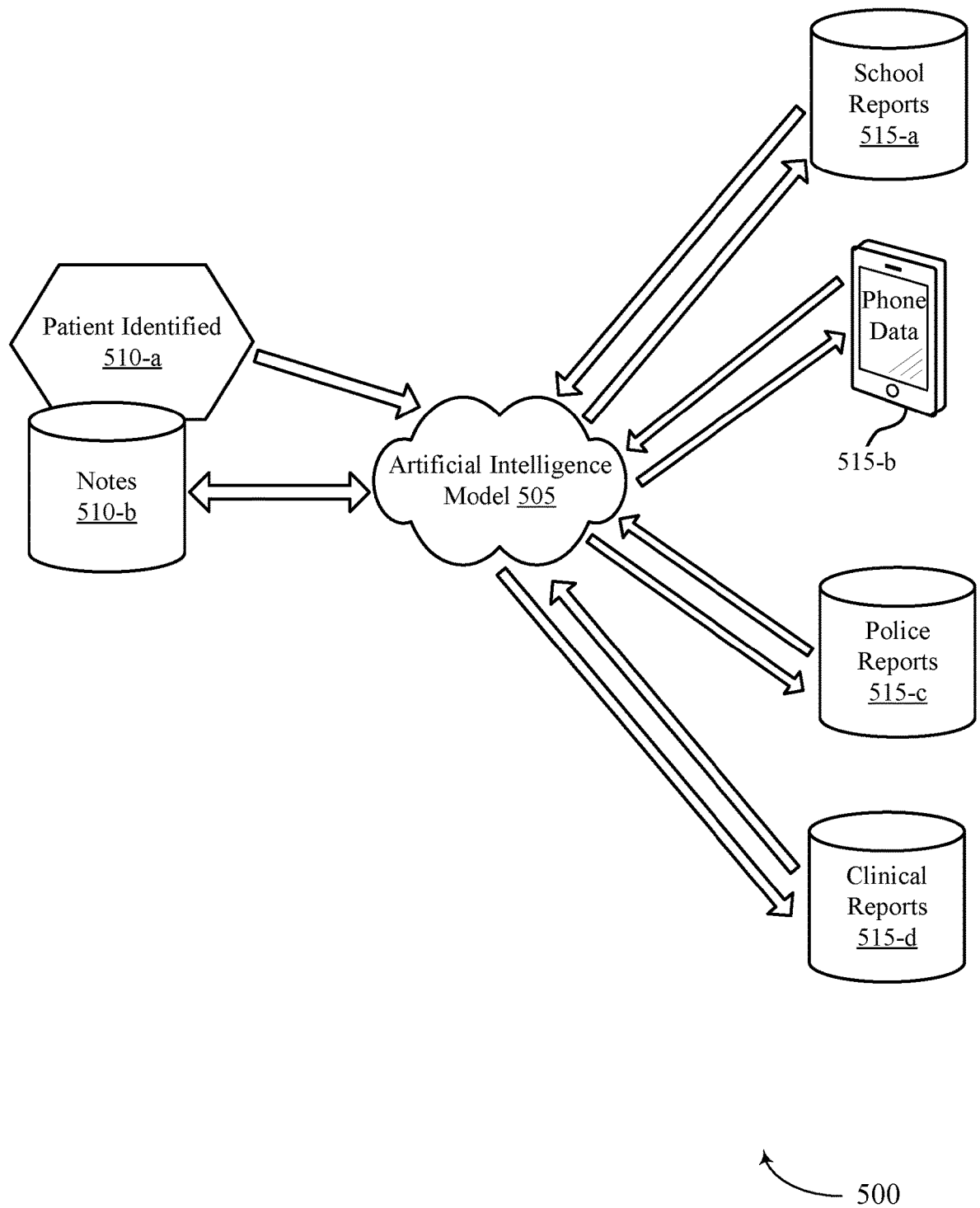
FIG. 5 illustrates an example of a system that support security for private data inputs to artificial intelligence models in accordance with aspects of the present disclosure.

FIG. 5 illustrates an example of a system 500 that supports security for private data inputs to artificial intelligence models in accordance with aspects of the present disclosure. The system 500 may include an artificial intelligence model 505 (e.g., running on an application server), public data sources 510, and private data sources 515. As depicted in the example of FIG. 5, the artificial intelligence model 505 may be hosted on a cloud application or cloud platform. In some cases, the functions performed by the artificial intelligence model 505 may instead be performed by a component of the private data sources 510, the public data sources 515, or a combination. As previously discussed, the artificial intelligence model 505 may receive a request from a user operating a user device (not shown). In some cases, the request may include some public information (e.g., from a public data source 510). In some examples, the artificial intelligence model 505 may identify outcomes and may provide the outcomes to the user device.

As described in the example of FIG. 5, the artificial intelligence model 505 may be implemented in an office of a psychologist. A psychologist (such as a user operating a user device) may submit known information about a patient to the artificial intelligence model 505 for evaluation prior to an appointment with the patient. For example, before an appointment with a patient, a psychologist may review the patient's record based on their notes to determine if the patient should continue counseling. Using the techniques described in this disclosure, the psychologist may run the artificial intelligence model 505 on a request to identify whether the patient should continue counseling. For example, the public data sources 510 in this example may include notes 510-*b* from the psychologist, as well as an indicator or identifier of the patient 510-*a*. In this cases, if the police had been called in suspected spousal abuse at the home of the patient (e.g., but not involving the patient), then such information may be considered part of a private data source 515 and may not be reported directly to the psychologist. According to one or more aspects, the artificial intelligence model 505 may be configured to flag a problem related to activity at the address related to the patient. In this way, the artificial intelligence model 505 may provide an indication that the psychologist may spend more time investigating the patient. In some cases, the psychologist may be associated with a user credential, and the psychologist may log on to a user device (not shown) using the user credential. For example, if a psychologist is part of a specific organization, the artificial intelligence model 505 may identify the organization using the user credential. In some cases, the artificial intelligence model 505 may run on the public data sources 510 associated with that organization and an extended data set associated with that organization. In some examples, the extended data set may include the public data sources 510 and the private data sources 515.

Upon receiving the request from the psychologist, the artificial intelligence model 505 may identify the public data sources 510 and the private data sources 515 associated with the request. Additionally, as records are updated at a data source, their correlations with various outcomes may also be modified. The artificial intelligence model 505 may utilize new data interactions tied with historical information to make timely predictions. The artificial intelligence model 505 may identify the data sources to investigate. In the example of FIG. 5, the psychologist may want to monitor a patient and may submit their known information to the artificial intelligence model 505. In such a case, the known information about the patient may be considered as public data sources 510. The patient's address may define which crime, school, social data feeds the psychologist needs to see to start investigating. As a result, school reports 515-a, phone data 515-b, police reports 515-c, clinical reports 515-d, or any combination of these or other confidential records related to the identified patient may be considered as private data sources 515. As the psychologist updates their records, correlations between their observations and data feeds can start to identify types of concerns for the psychologist. Thus, the artificial intelligence model 505 may incorporate new data interactions tied with historical information to make timely predictions, as well as to determine new reasons to obfuscate confidential information.

Figure 6:
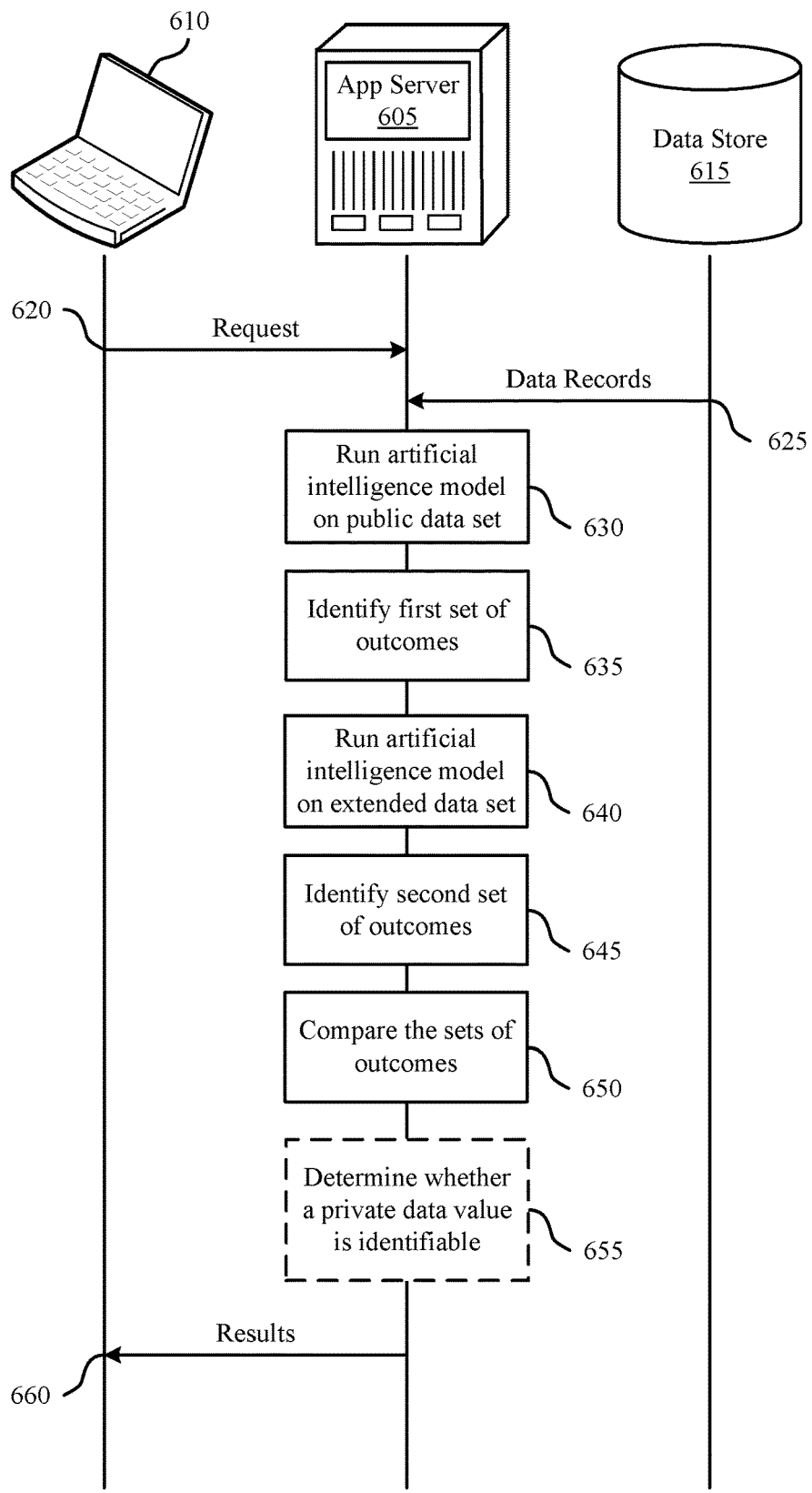
FIG. 6 illustrates an example of a process flow that supports security for private data inputs to artificial intelligence models in accordance with aspects of the present disclosure.

FIG. 6 illustrates an example of a process flow 600 that supports security for private data inputs to artificial intelligence models in accordance with aspects of the present disclosure. The process flow 600 may involve an application server 605 or some other device for hosting an artificial intelligence model, a user device 610, and a data store 615, which may be examples of the corresponding devices described with reference to FIGS. 1 through 5. In some cases, some or all of the functionality of the application server 605 may be performed by components of the user device 610 or the data store 615. The application server 605 may implement a number of techniques to provide security for private data inputs to artificial intelligence models. Alternative examples of the following may be implemented, where some steps are performed in a different order than described or are not performed at all. In some cases, steps may include additional features not mentioned below, or further steps may be added.

At 620, a user may utilize the user device 610 to transmit a request to run an artificial intelligence model. In some cases, multiple users may simultaneously transmit requests to run different artificial intelligence models. The request may include a context (such as a user identifier, organization name, etc.). The application server 605 may identify the context associated with the request. For example, the context may be related to a specific clinician, a specific patient, a specific geographic area, a specific organization, etc. Based on the context, the application server 605 may identify a public data set associated with the request and a private data set associated with the request. In some cases, the application server 605 may identify an extended data set including the public data set and the private data set. The application server 605 may retrieve these data records from a data store 615 at 625.

At 630, the application server 605 may run the artificial intelligence model on a public data set associated with the request. In some examples, the public data set may include publicly available data. The application server 605 may identify the set of public data and may identify a data feed associated with the public data set. In some cases, running the artificial intelligence model on the public data set may include running the artificial intelligence model on the identified data feed.

At 635, the application server 605 may identify a first set of outcomes based on running the artificial intelligence model on the public data set. In some examples, the application server 605 may identify a first correlation between one or more public data values of the public data set and the first set of outcomes. In such examples, the application server 605 may identify the first set of outcomes based on the first correlation.

At 640, the application server 605 may run the artificial intelligence model on an extended data set associated with the request. In some examples, the extended data set may include both the public data set (or multiple public data sets) and a private data set (or multiple private data sets). As previously discussed, the public data set may include publicly available data and the private data set may include data having confidentiality implications. The application server 605 may identify the set of private data and may identify a data feed associated with the private data set. In some cases, running the artificial intelligence model on the extended data set may include running the artificial intelligence model on the identified data feed. Additionally or alternatively, the application server 605 may identify the set of public data and may identify a second data feed associated with the public data set. In some cases, running the artificial intelligence model on the extended data set may include running the artificial intelligence model on the data feed associated with the private data set as well as on the second data feed associated with the public data set.

At 645, the application server 605 may identify a second set of outcomes based on running the artificial intelligence model on the extended data set. In some examples, the application server 605 may identify a second correlation between one or more private data values of the private data set and the second set of outcomes. In such examples, the application server 605 may identify the second set of outcomes based on the second correlation.

At 650, the application server 605 may compare the first set of outcomes with the second set of outcomes to determine whether a difference between the first set of outcomes and the second set of outcomes satisfies a statistical threshold. For example, the application server 605 may determine whether the difference between the first set of outcomes and the second set of outcomes is statistically significant.

At 655, the application server 605 may determine whether a private data value from the set of private data is identifiable. For example, upon determining that the difference between the first set of outcomes and the second set of outcomes satisfies the statistical threshold, the application server 605 may determine that a private data value from the set of private data is identifiable based on the difference between the first set of outcomes and the second set of outcomes satisfying the statistical threshold.

At 660, the application server 605 may transmit, to the user device 610, a first set of results, where the first set of results is based on determining that the private data value is identifiable. In some cases, prior to transmitting, the application server 605 may obfuscate the first set of results based on determining that the private data value from the set of private data is identifiable. Alternatively, upon determining that the difference between the first set of outcomes and the second set of outcomes fails to satisfy the statistical threshold, the application server 605 may transmit, to the user device 610, a second set of results, where the second set of results includes the second set of outcomes.

Figure 7:
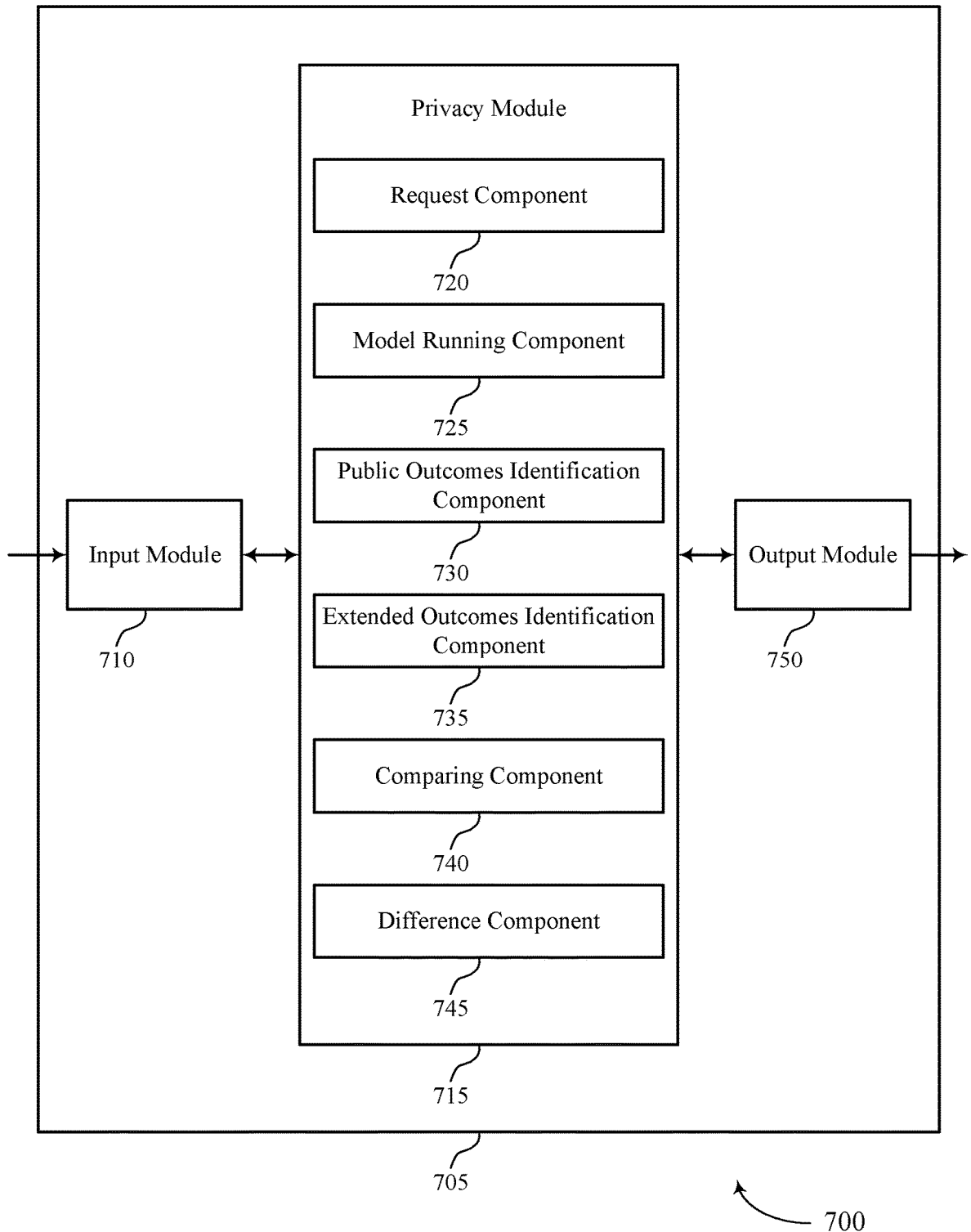
FIG. 7 shows a block diagram of an apparatus that supports security for private data inputs to artificial intelligence models in accordance with aspects of the present disclosure.

FIG. 7 shows a block diagram 700 of an apparatus 705 that supports security for private data inputs to artificial intelligence models in accordance with aspects of the present disclosure. The apparatus 705 may include an input module 710, a privacy module 715, and an output module 750. The apparatus 705 may also include a processor. Each of these components may be in communication with one another (e.g., via one or more buses). In some cases, the apparatus 705 may be an example of a user terminal, a database server, an application server, or a system containing multiple computing devices.

The input module 710 may manage input signals for the apparatus 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the apparatus 705 for processing. For example, the input module 710 may transmit input signals to the privacy module 715 for implementing methods to support security for private data inputs to artificial intelligence models. In some cases, the input module 710 may be a component of an input/output (I/O) controller 915 as described with reference to FIG. 9.

The privacy module 715 may include a request component 720, a model running component 725, a public outcomes identification component 730, an extended outcomes identification component 735, a comparing component 740, and a difference component 745. The privacy module 715 may be an example of aspects of the privacy module 805 or 910 described with reference to FIGS. 8 and 9.

The privacy module 715 and/or at least some of its various sub-components may be implemented in hardware, software executed by a processor, firmware, or any combination thereof. If implemented in software executed by a processor, the functions of the privacy module 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The privacy module 715 and/or at least some of its various sub-components may be physically located at various positions, including being distributed such that portions of functions are implemented at different physical locations by one or more physical devices. In some examples, the privacy module 715 and/or at least some of its various sub-components may be a separate and distinct component in accordance with various aspects of the present disclosure. In other examples, the privacy module 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The request component 720 may receive, from a user device, a request to run an artificial intelligence model (e.g., at a server, which may include the apparatus 705). The model running component 725 may run, in memory of the server, the artificial intelligence model on a public data set associated with the request. The model running component 725 may additionally run, in the memory of the server, the artificial intelligence model on an extended data set associated with the request, the extended data set including the public data set and a set of private data associated with the request. The public outcomes identification component 730 may identify a first set of outcomes based on running the artificial intelligence model on the public data set. The extended outcomes identification component 735 may identify a second set of outcomes based on running the artificial intelligence model on the extended data set.

The comparing component 740 may compare the first set of outcomes with the second set of outcomes to determine whether a difference between the first set of outcomes and the second set of outcomes satisfies a statistical threshold. Upon determining that the difference between the first set of outcomes and the second set of outcomes satisfies the statistical threshold, the difference component 745 may determine that a private data value from the set of private data is identifiable based on the difference between the first set of outcomes and the second set of outcomes satisfying the statistical threshold and may transmit, to the user device, a first set of results in response to the request, where the first set of results is based on determining that the private data value is identifiable. Upon determining that the difference between the first set of outcomes and the second set of outcomes fails to satisfy the statistical threshold, the difference component 745 may transmit, to the user device, a second set of results in response to the request, where the second set of results includes the second set of outcomes.

The output module 750 may manage output signals for the apparatus 705. For example, the output module 750 may receive signals from other components of the apparatus 705, such as the privacy module 715, and may transmit these signals to other components or devices. In some specific examples, the output module 750 may transmit output signals for display in a user interface, for storage in a database or data store, for further processing at a server or server cluster, or for any other processes at any number of devices or systems. In some cases, the output module 750 may be a component of an I/O controller 915 as described with reference to FIG. 9.

Figure 8:
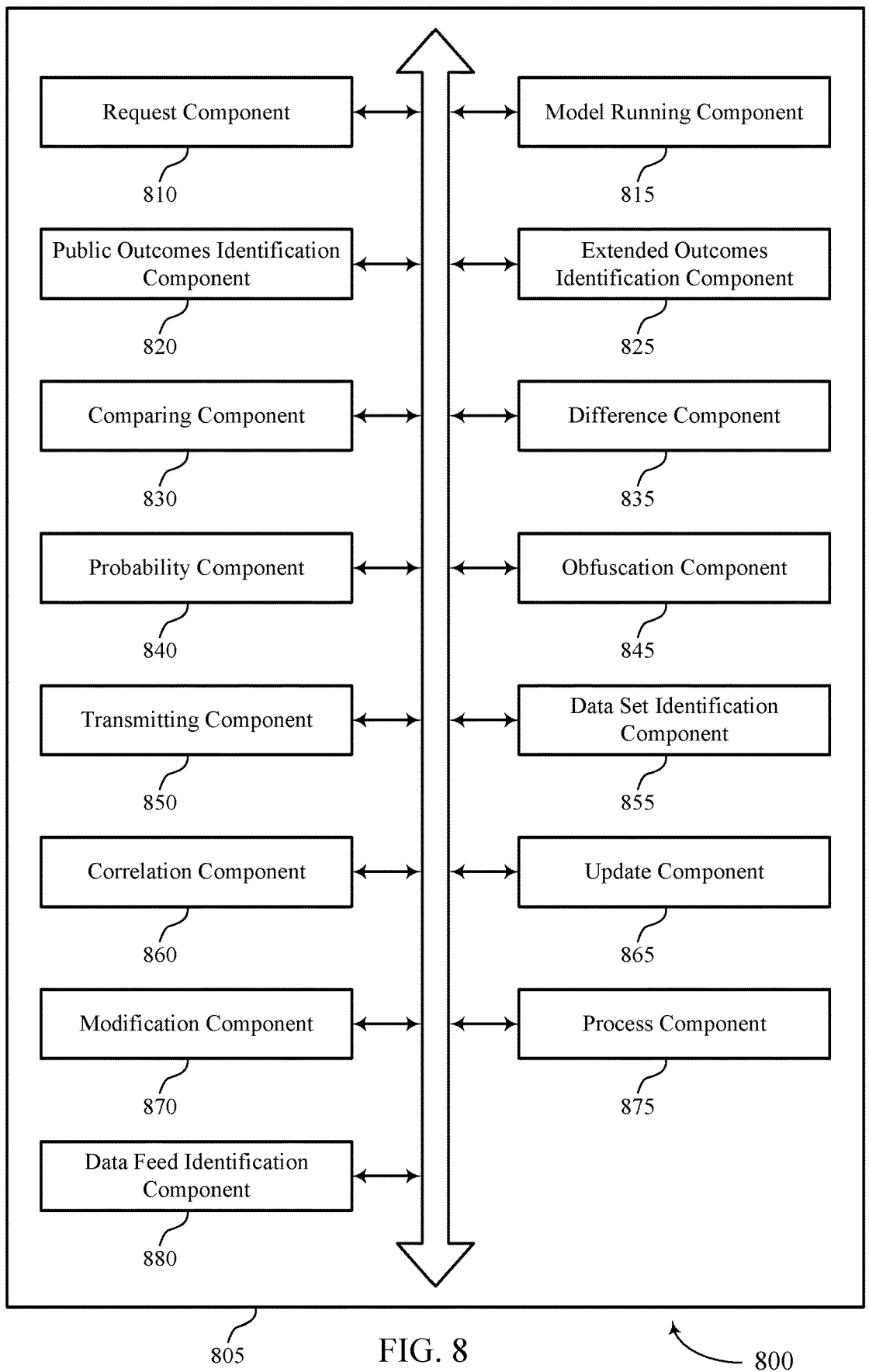
FIG. 8 shows a block diagram of a privacy module that supports security for private data inputs to artificial intelligence models in accordance with aspects of the present disclosure.

FIG. 8 shows a block diagram 800 of a privacy module 805 that supports security for private data inputs to artificial intelligence models in accordance with aspects of the present disclosure. The privacy module 805 may be an example of aspects of a privacy module 715 or a privacy module 910 described herein. The privacy module 805 may include a request component 810, a model running component 815, a public outcomes identification component 820, an extended outcomes identification component 825, a comparing component 830, a difference component 835, a probability component 840, an obfuscation component 845, a transmitting component 850, a data set identification component 855, a correlation component 860, an update component 865, a modification component 870, a process component 875, and a data feed identification component 880. Each of these modules may communicate, directly or indirectly, with one another (e.g., via one or more buses). The privacy module 805 may run an artificial intelligence model at a server.

The request component 810 may receive, from a user device, a request to run the artificial intelligence model. The model running component 815 may run, in memory of the server, the artificial intelligence model on a public data set associated with the request. In some examples, the model running component 815 may run, in the memory of the server, the artificial intelligence model on an extended data set associated with the request, the extended data set including the public data set and a set of private data associated with the request.

The public outcomes identification component 820 may identify a first set of outcomes based on running the artificial intelligence model on the public data set. The extended outcomes identification component 825 may identify a second set of outcomes based on running the artificial intelligence model on the extended data set. The comparing component 830 may compare the first set of outcomes with the second set of outcomes to determine whether a difference between the first set of outcomes and the second set of outcomes satisfies a statistical threshold. Upon determining that the difference between the first set of outcomes and the second set of outcomes satisfies the statistical threshold, the difference component 835 may determine that a private data value from the set of private data is identifiable based on the difference between the first set of outcomes and the second set of outcomes satisfying the statistical threshold and may transmit, to the user device, a first set of results in response to the request, where the first set of results is based on determining that the private data value is identifiable. Upon determining that the difference between the first set of outcomes and the second set of outcomes fails to satisfy the statistical threshold, the difference component 835 may transmit, to the user device, a second set of results in response to the request, where the second set of results includes the second set of outcomes. In some examples, the data set identification component 855 may format the first set of outcomes, the second set of outcomes, or both for display in a user interface of the user device.

The probability component 840 may calculate a probability of identifying the private data value from the set of private data based on the difference between the first set of outcomes and the second set of outcomes satisfying the statistical threshold, where determining that the private data value from the set of private data is identifiable is further based on the probability satisfying a threshold. In some examples, the difference component 835 may refrain from transmitting, to the user device, the second set of outcomes in response to the request based on determining that the private data value from the set of private data is identifiable. The obfuscation component 845 may obfuscate the first set of results based on determining that the private data value from the set of private data is identifiable. In some cases, transmitting the first set of results may include determining the obfuscated first set of results.

In some examples, the request component 810 may receive, from the user device, a second request to run the artificial intelligence model. In some examples, the public outcomes identification component 820 may identify a third set of outcomes based on running the artificial intelligence model on a second public data set. In some examples, the extended outcomes identification component 825 may identify a fourth set of outcomes based on running the artificial intelligence model on a second extended data set including the second public data set and a second set of private data associated with the second request. In some examples, the comparing component 830 may compare the third set of outcomes with the fourth set of outcomes to determine that a difference between the third set of outcomes and the fourth set of outcomes satisfies the statistical threshold. In some examples, the difference component 835 may determine that each private data value from the second set of private data is not identifiable based on the difference between the third set of outcomes and the fourth set of outcomes satisfying the statistical threshold. The transmitting component 850 may transmit, to the user device, a third set of results in response to the second request, where the third set of results includes the fourth set of outcomes.

The data set identification component 855 may identify the public data set based on the received request. The correlation component 860 may identify a first correlation between one or more public data values of the public data set and the first set of outcomes, where identifying the first set of outcomes is based on the first correlation. In some examples, the data set identification component 855 may identify the extended data set based on the received request. In some examples, the correlation component 860 may identify a second correlation between one or more private data values of the set of private data, the one or more public data values of the public data set, and the second set of outcomes, where identifying the second set of outcomes is based on the second correlation. In some cases, the public data set includes publicly available data, and the set of private data includes data having confidentiality implications.

The update component 865 may receive an update to the public data set, where the update includes addition or deletion of at least one public data value to or from the public data set. In some examples, the update component 865 may receive an update to the extended data set, where the update includes addition or deletion of at least one private data value to or from the extended data set. The modification component 870 may modify the first correlation based on the update to the public data set, where identifying the first set of outcomes is based on the modified first correlation. In some examples, the modification component 870 may modify the second correlation based on the update to the extended data set, where identifying the second set of outcomes is based on the modified second correlation.

In some examples, the request component 810 may receive, from the user device, a second request for the update to the extended data set. In some examples, the transmitting component 850 may transmit, to the user device, a notification indicating the update to the extended data set. In some examples, the transmitting component 850 may transmit, to the user device, a notification indicating the update to the extended data set based on receiving the update.

The process component 875 may initiate a process (e.g., a business process) to determine that the update includes addition or deletion of a threshold number of private data values to or from the extended data set. In some examples, the transmitting component 850 may transmit, to the user device, a notification indicating the update to the extended data set based on determining that the update includes addition or deletion of the threshold number of private data values to or from the extended data set.

In some examples, the data set identification component 855 may identify the public data set based on the received request. The data feed identification component 880 may identify a data feed associated with the public data set, where running the artificial intelligence model on the public data set includes running the artificial intelligence model on the identified data feed. In some examples, the data set identification component 855 may identify the set of private data based on the received request. In some examples, the data feed identification component 880 may identify a data feed associated with the set of private data, where running the artificial intelligence model on the extended data set includes running the artificial intelligence model on the identified data feed.

In some examples, the request component 810 may receive, from a second user device, a second request to run the artificial intelligence model. In some examples, the model running component 815 may run, in the memory of the server, the artificial intelligence model on a second public data set and a second extended data set associated with the second request. In some examples, the transmitting component 850 may transmit, to the second user device, a third set of results in response to the second request based on running the artificial intelligence model.

Figure 9:
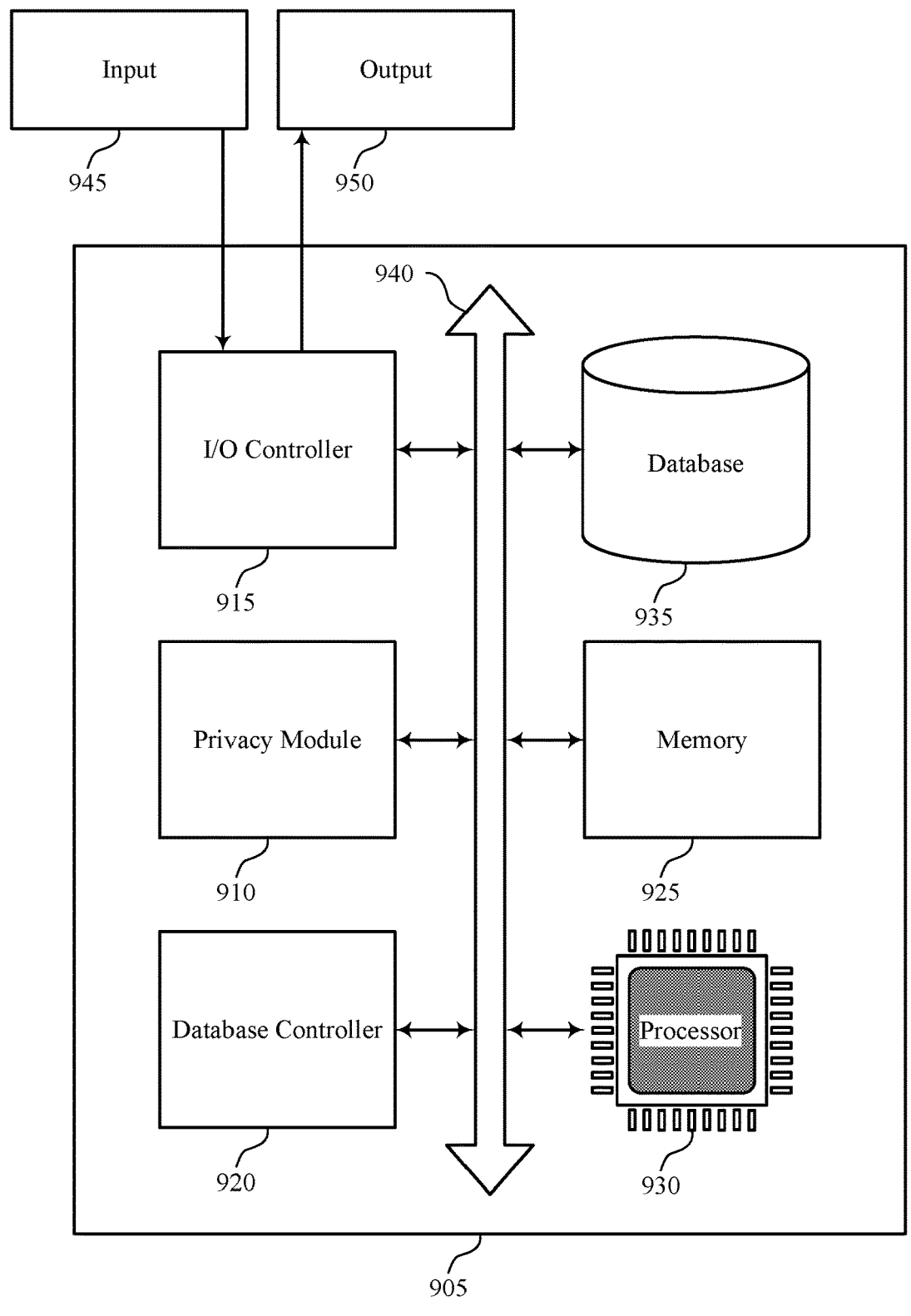
FIG. 9 shows a diagram of a system including a device that supports security for private data inputs to artificial intelligence models in accordance with aspects of the present disclosure.

FIG. 9 shows a diagram of a system 900 including a device 905 that supports security for private data inputs to artificial intelligence models in accordance with aspects of the present disclosure. The device 905 may be an example of or include the components of an application server or an apparatus 705 as described herein. The device 905 may include components for bi-directional data communications including components for transmitting and receiving communications, including a privacy module 910, an I/O controller 915, a database controller 920, memory 925, a processor 930, and a database 935. These components may be in electronic communication via one or more buses (e.g., bus 940).

The privacy module 910 may be an example of a privacy module 715 or 805 as described herein. For example, the privacy module 910 may perform any of the methods or processes described above with reference to FIGS. 7 and 8. In some cases, the privacy module 910 may be implemented in hardware, software executed by a processor, firmware, or any combination thereof.

The I/O controller 915 may manage input signals 945 and output signals 950 for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a data lake, or an emergency backup database.

Memory 925 may include random access memory (RAM) and read-only memory (ROM). The memory 925 may store computer-readable, computer-executable software including instructions that, when executed, cause the processor to perform various functions described herein. In some cases, the memory 925 may contain, among other things, a basic I/O system (BIOS) which may control basic hardware or software operation such as the interaction with peripheral components or devices.

The processor 930 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting security for private data inputs to artificial intelligence models).

Figure 10:
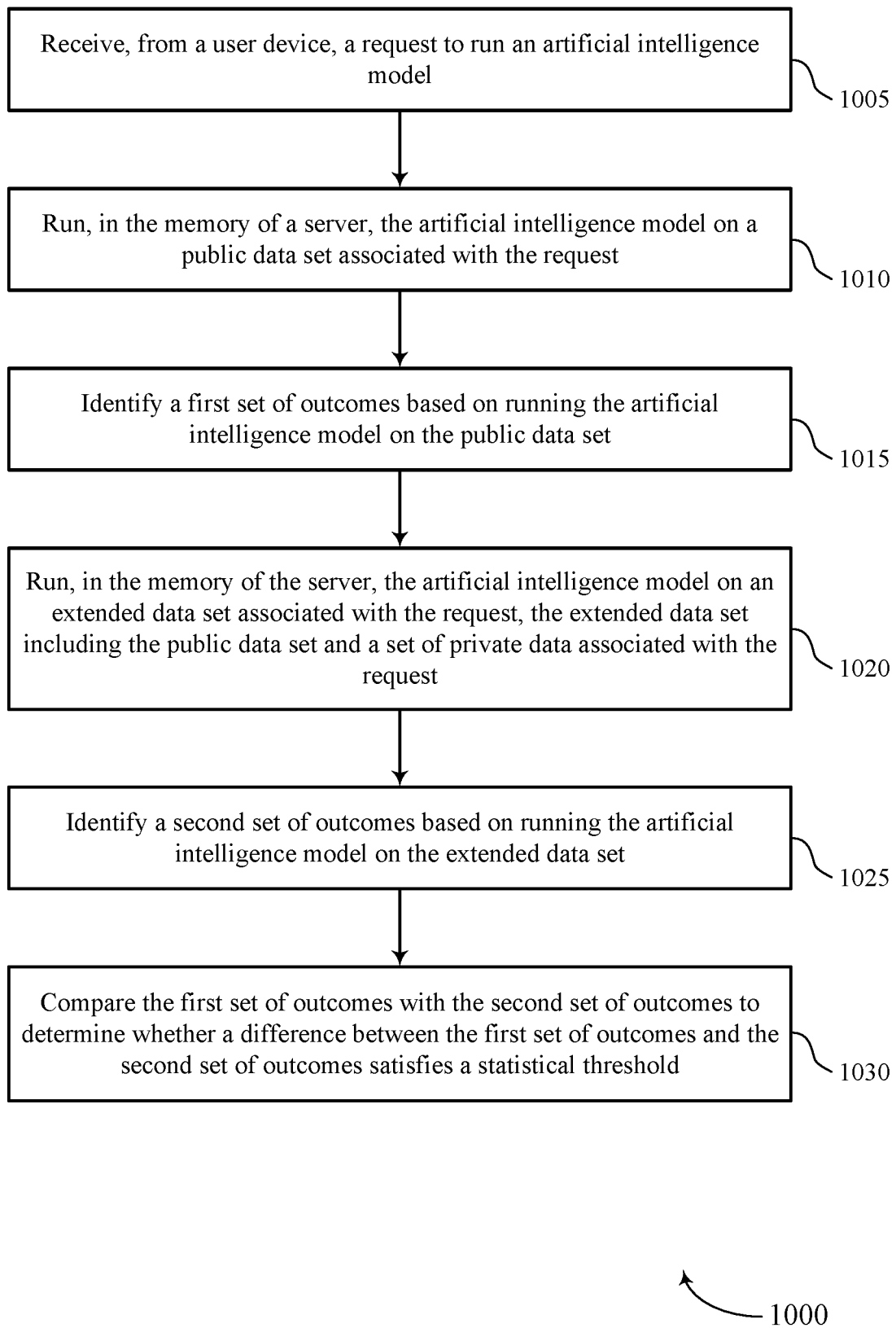
FIGS. 10 through 12 show flowcharts illustrating methods that support security for private data inputs to artificial intelligence models in accordance with aspects of the present disclosure.

FIG. 10 shows a flowchart illustrating a method 1000 that supports security for private data inputs to artificial intelligence models in accordance with aspects of the present disclosure. The operations of method 1000 may be implemented by an application server or its components as described herein. For example, the operations of method 1000 may be performed by a privacy module as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1005, the application server may receive, from a user device, a request to run an artificial intelligence model. The operations of 1005 may be performed according to the methods described herein. In some examples, aspects of the operations of 1005 may be performed by a request component as described with reference to FIGS. 7 through 9.

At 1010, the application server may run, in memory of the server, the artificial intelligence model on a public data set associated with the request. The operations of 1010 may be performed according to the methods described herein. In some examples, aspects of the operations of 1010 may be performed by a model running component as described with reference to FIGS. 7 through 9.

At 1015, the application server may identify a first set of outcomes based on running the artificial intelligence model on the public data set. The operations of 1015 may be performed according to the methods described herein. In some examples, aspects of the operations of 1015 may be performed by a public outcomes identification component as described with reference to FIGS. 7 through 9.

At 1020, the application server may run, in the memory of the server, the artificial intelligence model on an extended data set associated with the request, the extended data set including the public data set and a set of private data associated with the request. The operations of 1020 may be performed according to the methods described herein. In some examples, aspects of the operations of 1020 may be performed by a model running component as described with reference to FIGS. 7 through 9.

At 1025, the application server may identify a second set of outcomes based on running the artificial intelligence model on the extended data set. The operations of 1025 may be performed according to the methods described herein. In some examples, aspects of the operations of 1025 may be performed by an extended outcomes identification component as described with reference to FIGS. 7 through 9.

At 1030, the application server may compare the first set of outcomes with the second set of outcomes to determine whether a difference between the first set of outcomes and the second set of outcomes satisfies a statistical threshold. The operations of 1030 may be performed according to the methods described herein. In some examples, aspects of the operations of 1030 may be performed by a comparing component as described with reference to FIGS. 7 through 9.

In some cases, upon determining that the difference between the first set of outcomes and the second set of outcomes satisfies the statistical threshold, the application server may determine that a private data value from the set of private data is identifiable based on the difference between the first set of outcomes and the second set of outcomes satisfying the statistical threshold and may transmit, to the user device, a first set of results in response to the request, where the first set of results is based on determining that the private data value is identifiable. Alternatively, upon determining that the difference between the first set of outcomes and the second set of outcomes fails to satisfy the statistical threshold, the application server may transmit, to the user device, a second set of results in response to the request, where the second set of results includes the second set of outcomes.

Figure 11:
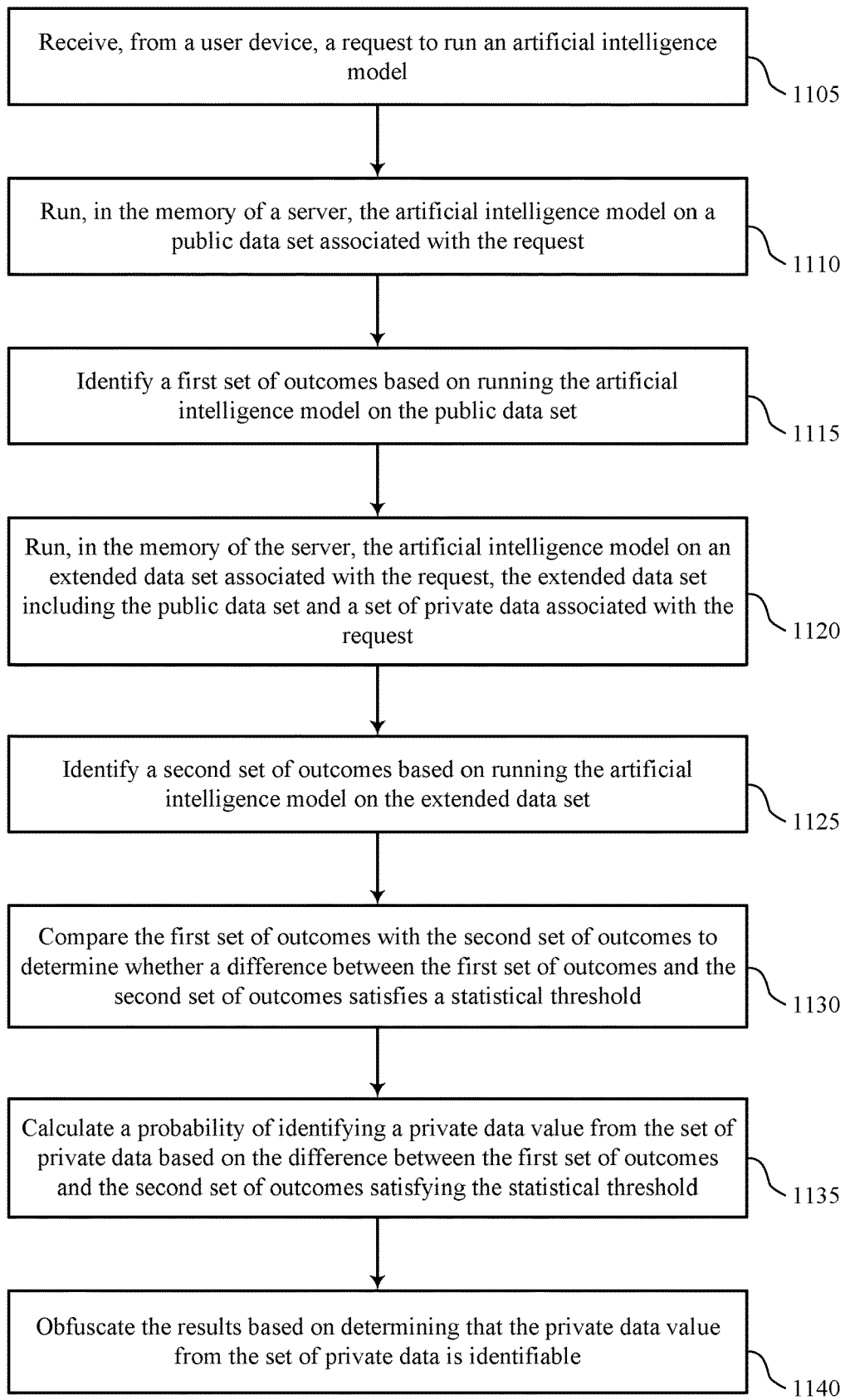

FIG. 11 shows a flowchart illustrating a method 1100 that supports security for private data inputs to artificial intelligence models in accordance with aspects of the present disclosure. The operations of method 1100 may be implemented by an application server or its components as described herein. For example, the operations of method 1100 may be performed by a privacy module as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1105, the application server may receive, from a user device, a request to run an artificial intelligence model. The operations of 1105 may be performed according to the methods described herein. In some examples, aspects of the operations of 1105 may be performed by a request component as described with reference to FIGS. 7 through 9.

At 1110, the application server may run, in memory of the server, the artificial intelligence model on a public data set associated with the request. The operations of 1110 may be performed according to the methods described herein. In some examples, aspects of the operations of 1110 may be performed by a model running component as described with reference to FIGS. 7 through 9.

At 1115, the application server may identify a first set of outcomes based on running the artificial intelligence model on the public data set. The operations of 1115 may be performed according to the methods described herein. In some examples, aspects of the operations of 1115 may be performed by a public outcomes identification component as described with reference to FIGS. 7 through 9.

At 1120, the application server may run, in the memory of the server, the artificial intelligence model on an extended data set associated with the request, the extended data set including the public data set and a set of private data associated with the request. The operations of 1120 may be performed according to the methods described herein. In some examples, aspects of the operations of 1120 may be performed by a model running component as described with reference to FIGS. 7 through 9.

At 1125, the application server may identify a second set of outcomes based on running the artificial intelligence model on the extended data set. The operations of 1125 may be performed according to the methods described herein. In some examples, aspects of the operations of 1125 may be performed by an extended outcomes identification component as described with reference to FIGS. 7 through 9.

At 1130, the application server may compare the first set of outcomes with the second set of outcomes to determine whether a difference between the first set of outcomes and the second set of outcomes satisfies a statistical threshold. The operations of 1130 may be performed according to the methods described herein. In some examples, aspects of the operations of 1130 may be performed by a comparing component as described with reference to FIGS. 7 through 9.

At 1135, the application server may calculate a probability of identifying a private data value from the set of private data based on the difference between the first set of outcomes and the second set of outcomes satisfying the statistical threshold. In some cases, the application server may determine that the private data value from the set of private data is identifiable based on the probability satisfying a threshold. The operations of 1135 may be performed according to the methods described herein. In some examples, aspects of the operations of 1135 may be performed by a probability component as described with reference to FIGS. 7 through 9.

At 1140, the application server may obfuscate a set of results based on determining that the private data value from the set of private data is identifiable. In some examples, transmitting the results may include transmitting the obfuscated set of results. The operations of 1140 may be performed according to the methods described herein. In some examples, aspects of the operations of 1140 may be performed by an obfuscation component as described with reference to FIGS. 7 through 9.

Figure 12:
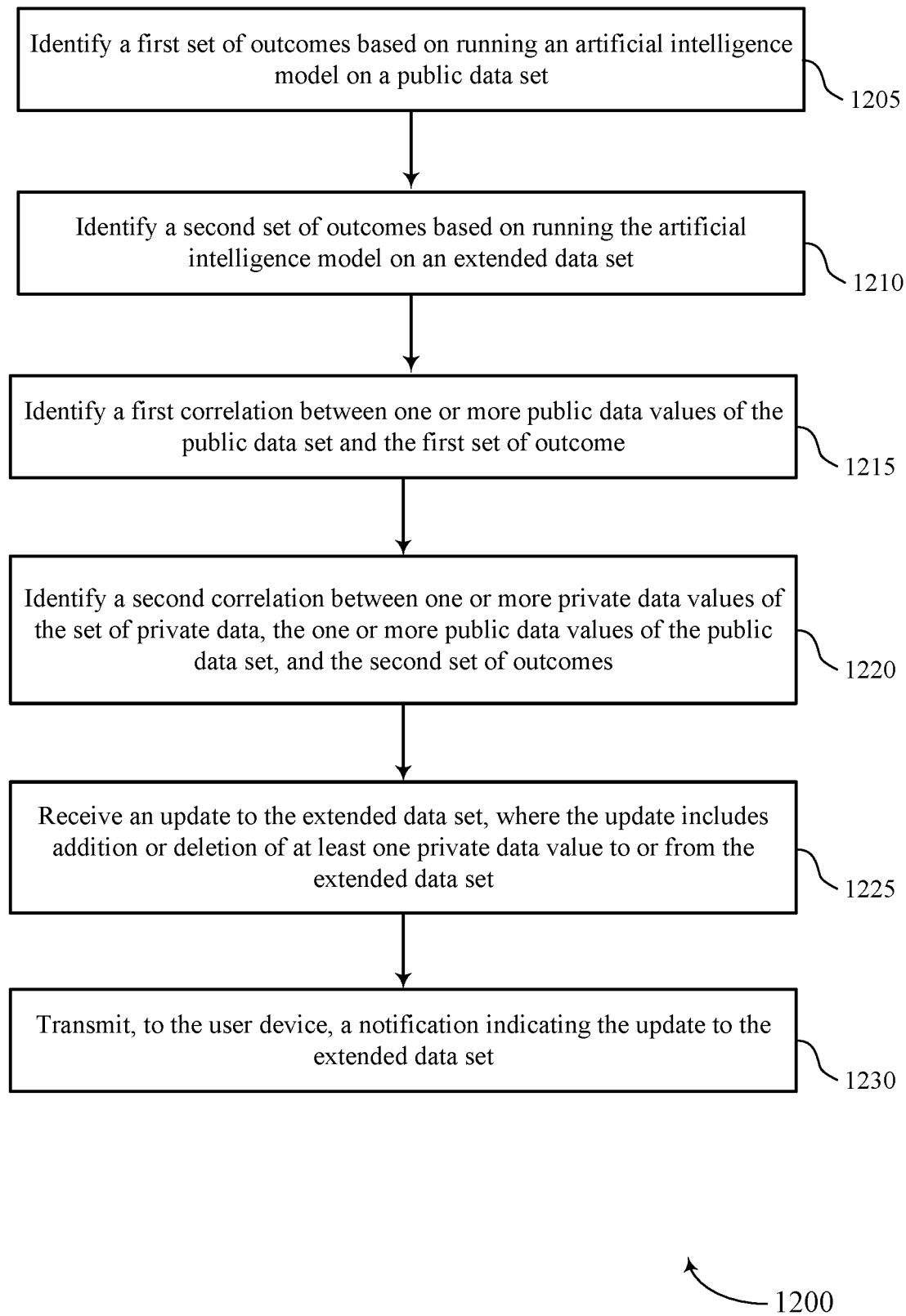

FIG. 12 shows a flowchart illustrating a method 1200 that supports security for private data inputs to artificial intelligence models in accordance with aspects of the present disclosure. The operations of method 1200 may be implemented by an application server or its components as described herein. For example, the operations of method 1200 may be performed by a privacy module as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1205, the application server may identify a first set of outcomes based on running an artificial intelligence model on a public data set. The operations of 1205 may be performed according to the methods described herein. In some examples, aspects of the operations of 1205 may be performed by a public outcomes identification component as described with reference to FIGS. 7 through 9.

In some examples, the application server may run, in the memory of the server, the artificial intelligence model on an extended data set associated with the request, the extended data set including the public data set and a set of private data associated with the request. At 1210, the application server may identify a second set of outcomes based on running the artificial intelligence model on the extended data set. The operations of 1210 may be performed according to the methods described herein. In some examples, aspects of the operations of 1210 may be performed by an extended outcomes identification component as described with reference to FIGS. 7 through 9.

At 1215, the application server may identify a first correlation between one or more public data values of the public data set and the first set of outcomes. In some examples, the application server may identify the first set of outcomes is based on the first correlation. The operations of 1215 may be performed according to the methods described herein. In some examples, aspects of the operations of 1215 may be performed by a correlation component as described with reference to FIGS. 7 through 9.

At 1220, the application server may identify a second correlation between one or more private data values of the set of private data, the one or more public data values of the public data set, and the second set of outcomes. In some examples, the application server may identify the second set of outcomes is based on the second correlation. The operations of 1220 may be performed according to the methods described herein. In some examples, aspects of the operations of 1220 may be performed by a correlation component as described with reference to FIGS. 7 through 9.

At 1225, the application server may receive an update to the extended data set, where the update includes addition or deletion of at least one private data value to or from the extended data set. The operations of 1225 may be performed according to the methods described herein. In some examples, aspects of the operations of 1225 may be performed by an update component as described with reference to FIGS. 7 through 9.

At 1230, the application server may transmit, to the user device, a notification indicating the update to the extended data set. However, the notification may not indicate any specific private data value added to or deleted from the extended data set. The operations of 1230 may be performed according to the methods described herein. In some examples, aspects of the operations of 1230 may be performed by a transmitting component as described with reference to FIGS. 7 through 9.

A method for running an artificial intelligence model at a server is described. The method may include receiving, from a user device, a request to run the artificial intelligence model; running, in memory of the server, the artificial intelligence model on a public data set associated with the request; identifying a first set of outcomes based on running the artificial intelligence model on the public data set; running, in the memory of the server, the artificial intelligence model on an extended data set associated with the request, the extended data set including the public data set and a set of private data associated with the request; identifying a second set of outcomes based on running the artificial intelligence model on the extended data set; and comparing the first set of outcomes with the second set of outcomes to determine whether a difference between the first set of outcomes and the second set of outcomes satisfies a statistical threshold. Upon determining that the difference between the first set of outcomes and the second set of outcomes satisfies the statistical threshold, the method may include determining that a private data value from the set of private data is identifiable based on the difference between the first set of outcomes and the second set of outcomes satisfying the statistical threshold and transmitting, to the user device, a first set of results in response to the request, where the first set of results is based at least in part on determining that the private data value is identifiable. Additionally or alternatively, upon determining that the difference between the first set of outcomes and the second set of outcomes fails to satisfy the statistical threshold, the method may include transmitting, to the user device, a second set of results in response to the request, where the second set of results includes the second set of outcomes.

An apparatus for running an artificial intelligence model at a server is described. The apparatus may include a processor, memory in electronic communication with the processor, and instructions stored in the memory. The instructions may be executable by the processor to cause the apparatus to receive, from a user device, a request to run the artificial intelligence model; run, in memory of the server, the artificial intelligence model on a public data set associated with the request; identify a first set of outcomes based on running the artificial intelligence model on the public data set; run, in the memory of the server, the artificial intelligence model on an extended data set associated with the request, the extended data set including the public data set and a set of private data associated with the request; identify a second set of outcomes based on running the artificial intelligence model on the extended data set; and compare the first set of outcomes with the second set of outcomes to determine whether a difference between the first set of outcomes and the second set of outcomes satisfies a statistical threshold. Upon determining that the difference between the first set of outcomes and the second set of outcomes satisfies the statistical threshold, the instructions may be executable by the processor to cause the apparatus to determine that a private data value from the set of private data is identifiable based on the difference between the first set of outcomes and the second set of outcomes satisfying the statistical threshold and transmit, to the user device, a first set of results in response to the request, where the first set of results is based at least in part on determining that the private data value is identifiable. Additionally or alternatively, upon determining that the difference between the first set of outcomes and the second set of outcomes fails to satisfy the statistical threshold, the instructions may be executable by the processor to cause the apparatus to transmit, to the user device, a second set of results in response to the request, where the second set of results includes the second set of outcomes.

Another apparatus for running an artificial intelligence model at a server is described. The apparatus may include means for receiving, from a user device, a request to run the artificial intelligence model; means for running, in memory of the server, the artificial intelligence model on a public data set associated with the request; means for identifying a first set of outcomes based on running the artificial intelligence model on the public data set; means for running, in the memory of the server, the artificial intelligence model on an extended data set associated with the request, the extended data set including the public data set and a set of private data associated with the request; means for identifying a second set of outcomes based on running the artificial intelligence model on the extended data set; and means for comparing the first set of outcomes with the second set of outcomes to determine whether a difference between the first set of outcomes and the second set of outcomes satisfies a statistical threshold. Upon determining that the difference between the first set of outcomes and the second set of outcomes satisfies the statistical threshold, the apparatus may include means for determining that a private data value from the set of private data is identifiable based on the difference between the first set of outcomes and the second set of outcomes satisfying the statistical threshold and means for transmitting, to the user device, a first set of results in response to the request, where the first set of results is based at least in part on determining that the private data value is identifiable. Additionally or alternatively, upon determining that the difference between the first set of outcomes and the second set of outcomes fails to satisfy the statistical threshold, the apparatus may include means for transmitting, to the user device, a second set of results in response to the request, where the second set of results includes the second set of outcomes.

A non-transitory computer-readable medium storing code for running an artificial intelligence model at a server is described. The code may include instructions executable by a processor to receive, from a user device, a request to run the artificial intelligence model; run, in memory of the server, the artificial intelligence model on a public data set associated with the request; identify a first set of outcomes based on running the artificial intelligence model on the public data set; run, in the memory of the server, the artificial intelligence model on an extended data set associated with the request, the extended data set including the public data set and a set of private data associated with the request; identify a second set of outcomes based on running the artificial intelligence model on the extended data set; and compare the first set of outcomes with the second set of outcomes to determine whether a difference between the first set of outcomes and the second set of outcomes satisfies a statistical threshold. Upon determining that the difference between the first set of outcomes and the second set of outcomes satisfies the statistical threshold, the instructions may be executable by the processor to determine that a private data value from the set of private data is identifiable based on the difference between the first set of outcomes and the second set of outcomes satisfying the statistical threshold and transmit, to the user device, a first set of results in response to the request, where the first set of results is based at least in part on determining that the private data value is identifiable. Additionally or alternatively, upon determining that the difference between the first set of outcomes and the second set of outcomes fails to satisfy the statistical threshold, the instructions may be executable by the processor to transmit, to the user device, a second set of results in response to the request, where the second set of results includes the second set of outcomes.

Some examples of the method, apparatuses, and non-transitory computer-readable medium described herein may further include operations, features, means, or instructions for calculating a probability of identifying the private data value from the set of private data based on the difference between the first set of outcomes and the second set of outcomes satisfying the statistical threshold, where determining that the private data value from the set of private data is identifiable may be further based on the probability satisfying a threshold.

Some examples of the method, apparatuses, and non-transitory computer-readable medium described herein may further include operations, features, means, or instructions for refraining from transmitting, to the user device, the second set of outcomes in response to the request based on determining that the private data value from the set of private data is identifiable.

Some examples of the method, apparatuses, and non-transitory computer-readable medium described herein may further include operations, features, means, or instructions for obfuscating the first set of results based on determining that the private data value from the set of private data is identifiable, where transmitting the first set of results includes determining the obfuscated first set of results.

Some examples of the method, apparatuses, and non-transitory computer-readable medium described herein may further include operations, features, means, or instructions for receiving, from the user device, a second request to run the artificial intelligence model, identifying a third set of outcomes based on running the artificial intelligence model on a second public data set, identifying a fourth set of outcomes based on running the artificial intelligence model on a second extended data set including the second public data set and a second set of private data associated with the second request, comparing the third set of outcomes with the fourth set of outcomes to determine that a difference between the third set of outcomes and the fourth set of outcomes satisfies the statistical threshold, determining that each private data value from the second set of private data is not identifiable based on the difference between the third set of outcomes and the fourth set of outcomes satisfying the statistical threshold, and transmitting, to the user device, a third set of results in response to the second request, where the third set of results includes the fourth set of outcomes.

Some examples of the method, apparatuses, and non-transitory computer-readable medium described herein may further include operations, features, means, or instructions for identifying the public data set based on the received request, identifying a first correlation between one or more public data values of the public data set and the first set of outcomes, where identifying the first set of outcomes may be based on the first correlation, identifying the extended data set based on the received request, and identifying a second correlation between one or more private data values of the set of private data, the one or more public data values of the public data set, and the second set of outcomes, where identifying the second set of outcomes may be based on the second correlation.

Some examples of the method, apparatuses, and non-transitory computer-readable medium described herein may further include operations, features, means, or instructions for receiving an update to the public data set, where the update includes addition or deletion of at least one public data value to or from the public data set and modifying the first correlation based on the update to the public data set, where identifying the first set of outcomes may be based on the modified first correlation.

Some examples of the method, apparatuses, and non-transitory computer-readable medium described herein may further include operations, features, means, or instructions for receiving an update to the extended data set, where the update includes addition or deletion of at least one private data value to or from the extended data set, and modifying the second correlation based on the update to the extended data set, where identifying the second set of outcomes may be based on the modified second correlation.

Some examples of the method, apparatuses, and non-transitory computer-readable medium described herein may further include operations, features, means, or instructions for receiving, from the user device, a second request for the update to the extended data set and transmitting, to the user device, a notification indicating the update to the extended data set.

Some examples of the method, apparatuses, and non-transitory computer-readable medium described herein may further include operations, features, means, or instructions for transmitting, to the user device, a notification indicating the update to the extended data set based on receiving the update.

Some examples of the method, apparatuses, and non-transitory computer-readable medium described herein may further include operations, features, means, or instructions for initiating a process to determine that the update includes addition or deletion of a threshold number of private data values to or from the extended data set and transmitting, to the user device, a notification indicating the update to the extended data set based on determining that the update includes addition or deletion of the threshold number of private data values to or from the extended data set.

Some examples of the method, apparatuses, and non-transitory computer-readable medium described herein may further include operations, features, means, or instructions for identifying the public data set based on the received request and identifying a data feed associated with the public data set, where running the artificial intelligence model on the public data set includes running the artificial intelligence model on the identified data feed.

Some examples of the method, apparatuses, and non-transitory computer-readable medium described herein may further include operations, features, means, or instructions for identifying the set of private data based on the received request and identifying a data feed associated with the set of private data, where running the artificial intelligence model on the extended data set includes running the artificial intelligence model on the identified data feed.

Some examples of the method, apparatuses, and non-transitory computer-readable medium described herein may further include operations, features, means, or instructions for receiving, from a second user device, a second request to run the artificial intelligence model, running, in the memory of the server, the artificial intelligence model on a second public data set and a second extended data set associated with the second request, and transmitting, to the second user device, a third set of results in response to the second request based on running the artificial intelligence model.

In some examples of the method, apparatuses, and non-transitory computer-readable medium described herein, the public data set includes publicly available data, and the set of private data includes data having confidentiality implications.

Some examples of the method, apparatuses, and non-transitory computer-readable medium described herein may further include operations, features, means, or instructions for formatting the first set of outcomes, the second set of outcomes, or both for display in a user interface of the user device.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for running an artificial intelligence model at a server, comprising:
  receiving, from a user device, a request to run the artificial intelligence model;
  running, in memory of the server, the artificial intelligence model on a public data set associated with the request;
  identifying a first set of outcomes based at least in part on running the artificial intelligence model on the public data set;
  running, in the memory of the server, the artificial intelligence model on an extended data set associated with the request, the extended data set comprising the public data set and a set of private data associated with the request;
  identifying a second set of outcomes based at least in part on running the artificial intelligence model on the extended data set;
  comparing the first set of outcomes with the second set of outcomes to determine whether a difference between the first set of outcomes and the second set of outcomes satisfies a statistical threshold;
  upon determining that the difference between the first set of outcomes and the second set of outcomes satisfies the statistical threshold:
    determining that a private data value from the set of private data is identifiable based at least in part on the difference between the first set of outcomes and the second set of outcomes satisfying the statistical threshold; and
    transmitting, to the user device, a first set of results in response to the request, wherein the first set of results is based at least in part on determining that the private data value is identifiable; and
  upon determining that the difference between the first set of outcomes and the second set of outcomes fails to satisfy the statistical threshold:
    transmitting, to the user device, a second set of results in response to the request, wherein the second set of results comprises the second set of outcomes.

2. The method of claim 1, further comprising:
  calculating a probability of identifying the private data value from the set of private data based at least in part on the difference between the first set of outcomes and the second set of outcomes satisfying the statistical threshold, wherein determining that the private data value from the set of private data is identifiable is further based at least in part on the probability satisfying a threshold.

3. The method of claim 1, further comprising:
  refraining from transmitting, to the user device, the second set of outcomes in response to the request based at least in part on determining that the private data value from the set of private data is identifiable.

4. The method of claim 1, further comprising:
  obfuscating the first set of results based at least in part on determining that the private data value from the set of private data is identifiable, wherein transmitting the first set of results comprises determining the obfuscated first set of results.

5. The method of claim 1, further comprising:
  receiving, from the user device, a second request to run the artificial intelligence model;
  identifying a third set of outcomes based at least in part on running the artificial intelligence model on a second public data set;
  identifying a fourth set of outcomes based at least in part on running the artificial intelligence model on a second extended data set comprising the second public data set and a second set of private data associated with the second request;
  comparing the third set of outcomes with the fourth set of outcomes to determine that a difference between the third set of outcomes and the fourth set of outcomes satisfies the statistical threshold;
  determining that each private data value from the second set of private data is not identifiable based at least in part on the difference between the third set of outcomes and the fourth set of outcomes satisfying the statistical threshold; and
  transmitting, to the user device, a third set of results in response to the second request, wherein the third set of results comprises the fourth set of outcomes.

6. The method of claim 1, further comprising:
  identifying the public data set based at least in part on the received request;
  identifying a first correlation between one or more public data values of the public data set and the first set of outcomes, wherein identifying the first set of outcomes is based at least in part on the first correlation;
  identifying the extended data set based at least in part on the received request; and
  identifying a second correlation between one or more private data values of the set of private data, the one or more public data values of the public data set, and the second set of outcomes, wherein identifying the second set of outcomes is based at least in part on the second correlation.

7. The method of claim 6, further comprising:
  receiving an update to the public data set, wherein the update comprises addition or deletion of at least one public data value to or from the public data set; and
  modifying the first correlation based at least in part on the update to the public data set, wherein identifying the first set of outcomes is based at least in part on the modified first correlation.

8. The method of claim 6, further comprising:
  receiving an update to the extended data set, wherein the update comprises addition or deletion of at least one private data value to or from the extended data set; and
  modifying the second correlation based at least in part on the update to the extended data set, wherein identifying the second set of outcomes is based at least in part on the modified second correlation.

9. The method of claim 8, further comprising:
  receiving, from the user device, a second request for the update to the extended data set; and
  transmitting, to the user device, a notification indicating the update to the extended data set.

10. The method of claim 8, further comprising:
transmitting, to the user device, a notification indicating the update to the extended data set based at least in part on receiving the update.

11. The method of claim 8, further comprising:
initiating a process to determine that the update comprises addition or deletion of a threshold number of private data values to or from the extended data set; and
transmitting, to the user device, a notification indicating the update to the extended data set based at least in part on determining that the update comprises addition or deletion of the threshold number of private data values to or from the extended data set.

12. The method of claim 1, further comprising:
identifying the public data set based at least in part on the received request; and
identifying a data feed associated with the public data set, wherein running the artificial intelligence model on the public data set comprises running the artificial intelligence model on the identified data feed.

13. The method of claim 1, further comprising:
identifying the set of private data based at least in part on the received request; and
identifying a data feed associated with the set of private data, wherein running the artificial intelligence model on the extended data set comprises running the artificial intelligence model on the identified data feed.

14. The method of claim 1, further comprising:
receiving, from a second user device, a second request to run the artificial intelligence model;
running, in the memory of the server, the artificial intelligence model on a second public data set and a second extended data set associated with the second request; and
transmitting, to the second user device, a third set of results in response to the second request based at least in part on running the artificial intelligence model.

15. The method of claim 1, wherein the public data set comprises publicly available data, and the set of private data comprises data having confidentiality implications.

16. The method of claim 1, further comprising:
formatting the first set of outcomes, the second set of outcomes, or both for display in a user interface of the user device.

17. An apparatus for running an artificial intelligence model at a server, comprising:
a processor;
memory in electronic communication with the processor; and
instructions stored in the memory and executable by the processor to cause the apparatus to:
receive, from a user device, a request to run the artificial intelligence model;
run, in memory of the server, the artificial intelligence model on a public data set associated with the request;
identify a first set of outcomes based at least in part on running the artificial intelligence model on the public data set;
run, in the memory of the server, the artificial intelligence model on an extended data set associated with the request, the extended data set comprising the public data set and a set of private data associated with the request;
identify a second set of outcomes based at least in part on running the artificial intelligence model on the extended data set;
compare the first set of outcomes with the second set of outcomes to determine whether a difference between the first set of outcomes and the second set of outcomes satisfies a statistical threshold;
upon determining that the difference between the first set of outcomes and the second set of outcomes satisfies the statistical threshold:
determine that a private data value from the set of private data is identifiable based at least in part on the difference between the first set of outcomes and the second set of outcomes satisfying the statistical threshold; and
transmit, to the user device, a first set of results in response to the request, wherein the first set of results is based at least in part on determining that the private data value is identifiable; and
upon determining that the difference between the first set of outcomes and the second set of outcomes fails to satisfy the statistical threshold:
transmit, to the user device, a second set of results in response to the request, wherein the second set of results comprises the second set of outcomes.

18. The apparatus of claim 17, wherein the instructions are further executable by the processor to cause the apparatus to:
calculate a probability of identifying the private data value from the set of private data based at least in part on the difference between the first set of outcomes and the second set of outcomes satisfying the statistical threshold, wherein determining that the private data value from the set of private data is identifiable is further based at least in part on the probability satisfying a threshold.

19. A non-transitory computer-readable medium storing code for running an artificial intelligence model at a server, the code comprising instructions executable by a processor to:
receive, from a user device, a request to run the artificial intelligence model;
run, in memory of the server, the artificial intelligence model on a public data set associated with the request;
identify a first set of outcomes based at least in part on running the artificial intelligence model on the public data set;
run, in the memory of the server, the artificial intelligence model on an extended data set associated with the request, the extended data set comprising the public data set and a set of private data associated with the request;
identify a second set of outcomes based at least in part on running the artificial intelligence model on the extended data set;
compare the first set of outcomes with the second set of outcomes to determine whether a difference between the first set of outcomes and the second set of outcomes satisfies a statistical threshold;
upon determining that the difference between the first set of outcomes and the second set of outcomes satisfies the statistical threshold:
determine that a private data value from the set of private data is identifiable based at least in part on the difference between the first set of outcomes and the second set of outcomes satisfying the statistical threshold; and
transmit, to the user device, a first set of results in response to the request, wherein the first set of results is based at least in part on determining that the private data value is identifiable; and upon determining that the difference between the first set of outcomes and the second set of outcomes fails to satisfy the statistical threshold:

transmit, to the user device, a second set of results in response to the request, wherein the second set of results comprises the second set of outcomes.

20. The non-transitory computer-readable medium of claim 19, wherein the instructions are further executable to:

calculate a probability of identifying the private data value from the set of private data based at least in part on the difference between the first set of outcomes and the second set of outcomes satisfying the statistical threshold, wherein determining that the private data value from the set of private data is identifiable is further based at least in part on the probability satisfying a threshold.

* * * * *